(12) United States Patent
Huang et al.

(10) Patent No.: US 11,846,757 B2
(45) Date of Patent: Dec. 19, 2023

(54) OPTICAL IMAGING LENS ASSEMBLY

(71) Applicant: Zhejiang Sunny Optical Co., Ltd, Ningbo (CN)

(72) Inventors: Lin Huang, Ningbo (CN); Xin Zhou, Ningbo (CN)

(73) Assignee: Zhejiang Sunny Optical Co., Ltd, Ningbo (CN)

(*) Notice: Subject to any disclaimer, the term of this patent is extended or adjusted under 35 U.S.C. 154(b) by 325 days.

(21) Appl. No.: 16/867,906

(22) Filed: May 6, 2020

(65) Prior Publication Data

US 2020/0264411 A1 Aug. 20, 2020

Related U.S. Application Data

(63) Continuation of application No. PCT/CN2018/114513, filed on Nov. 8, 2018.

(30) Foreign Application Priority Data

Apr. 3, 2018 (CN) .......................... 201810290945.X

(51) Int. Cl.
*G02B 13/00* (2006.01)
*G02B 9/62* (2006.01)
(Continued)

(52) U.S. Cl.
CPC ........... *G02B 13/0045* (2013.01); *G02B 9/62* (2013.01); *G02B 13/06* (2013.01); *G02B 27/0025* (2013.01)

(58) Field of Classification Search
CPC ...... G02B 13/0045; G02B 9/62; G02B 13/06; G02B 13/02
See application file for complete search history.

(56) References Cited

U.S. PATENT DOCUMENTS

2014/0211325 A1 7/2014 Lai
2015/0138431 A1* 5/2015 Shin .......................... G02B 9/62
359/757
(Continued)

FOREIGN PATENT DOCUMENTS

CN 103576296 A 2/2014
CN 104297902 A 1/2015
(Continued)

OTHER PUBLICATIONS

International search report for application PCT/CN2018/114513 dated Jan. 30, 2019.
(Continued)

*Primary Examiner* — Alicia M Harrington
(74) *Attorney, Agent, or Firm* — Sughrue Mion, PLLC

(57) ABSTRACT

The present disclosure discloses an optical imaging lens assembly including, sequentially from an object side to an image side along an optical axis, a first lens, a second lens, a third lens, a fourth lens, a fifth lens, and a sixth lens. The first lens has a positive refractive power, both of an object-side surface and an image-side surface thereof are convex surfaces; the second lens has a negative refractive power; the third lens has a negative refractive power, and an image-side surface thereof is a concave surface; the fourth lens has a refractive power; the fifth lens has a refractive power, and an image-side surface thereof is a convex surface; the sixth lens has a refractive power, and an object-side surface thereof is a concave surface. Half of a maximal field-of-view HFOV of the optical imaging lens assembly satisfies HFOV<30°.

16 Claims, 15 Drawing Sheets

(51) Int. Cl.
  *G02B 13/06*   (2006.01)
  *G02B 27/00*   (2006.01)

(56) References Cited

U.S. PATENT DOCUMENTS

2016/0341934 A1* 11/2016 Mercado .............. H04N 5/2252
2017/0315334 A1* 11/2017 Liao ........................ G02B 9/62
2018/0024325 A1*  1/2018 Teraoka ............. G02B 13/0045
                                                    359/713

FOREIGN PATENT DOCUMENTS

| CN | 106062611 A | 10/2016 |
| CN | 106772955 A | 5/2017 |
| CN | 107065129 A | 8/2017 |
| CN | 107329234 A | 11/2017 |
| CN | 107450157 A | 12/2017 |
| CN | 206960765 U | 2/2018 |
| CN | 108375823 A | 8/2018 |
| TW | I567415 B | 1/2017 |

OTHER PUBLICATIONS

Written opinion in Chinese for application PCT/CN2018/114513 dated Jan. 30, 2019.

* cited by examiner

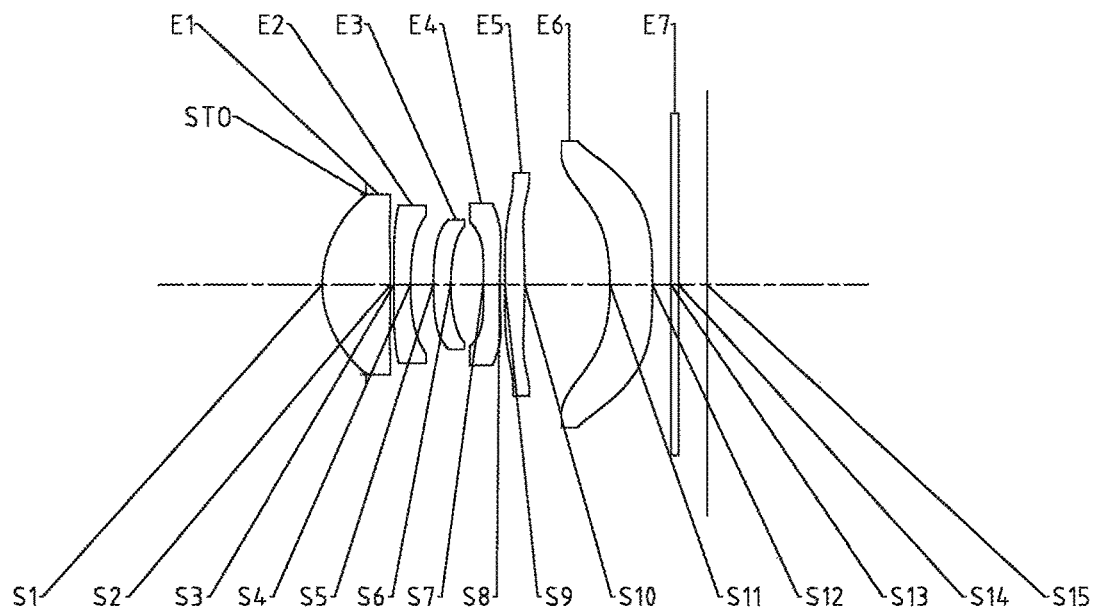
Fig. 5
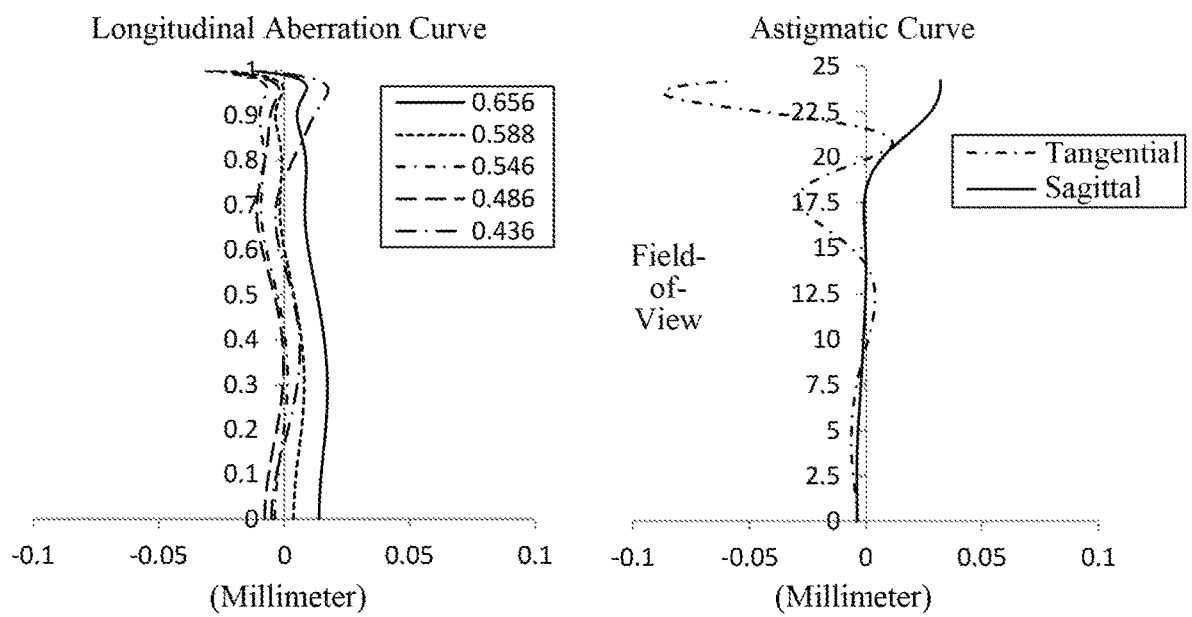
Fig. 6A
Fig. 6B

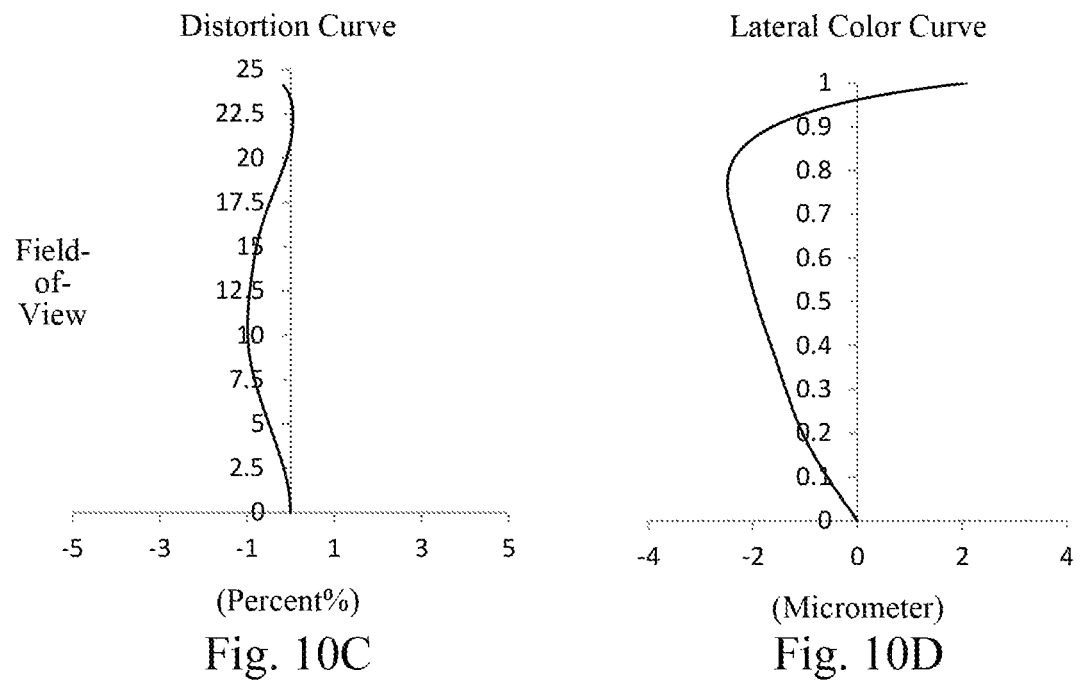
Fig. 10C
Fig. 10D
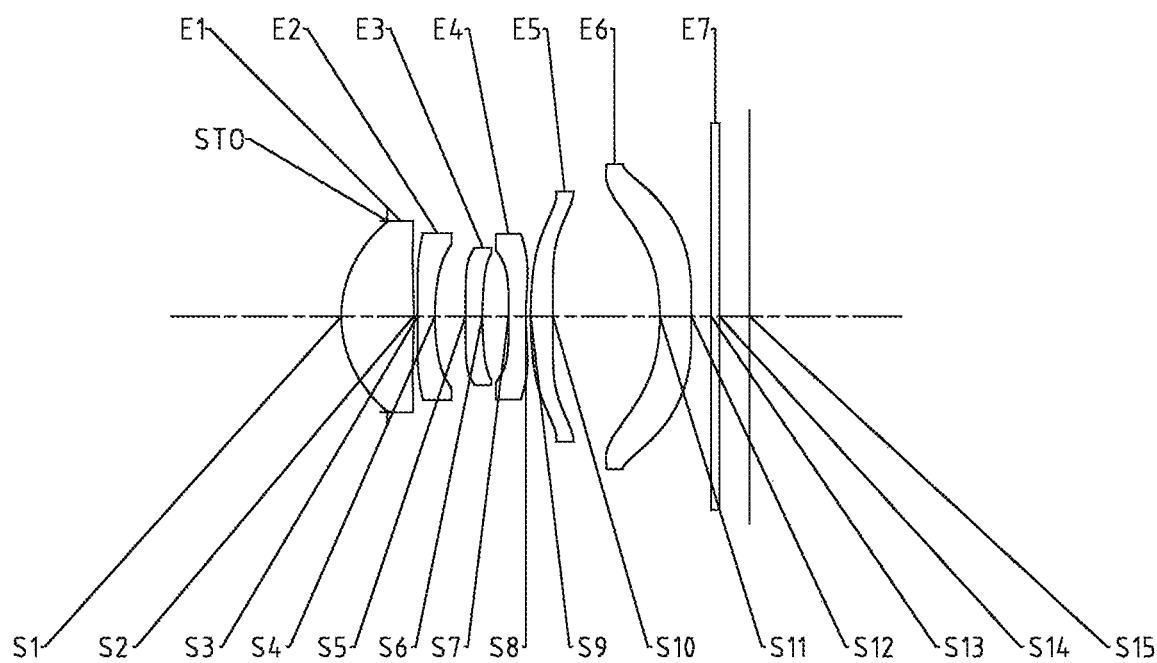
Fig. 11

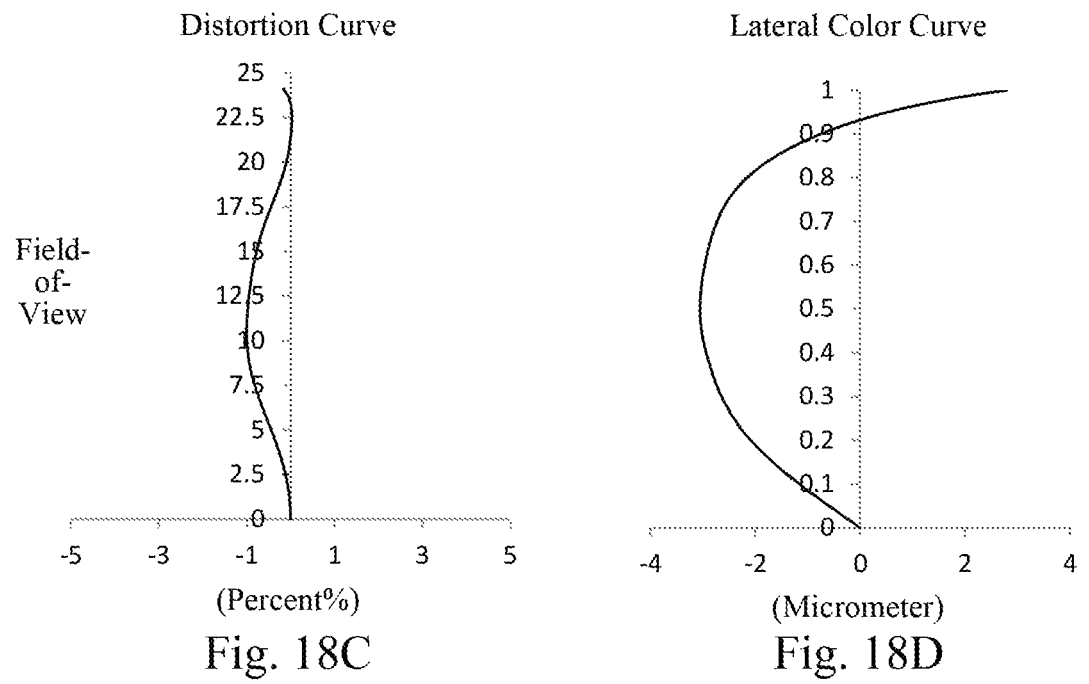
Fig. 18C
Fig. 18D
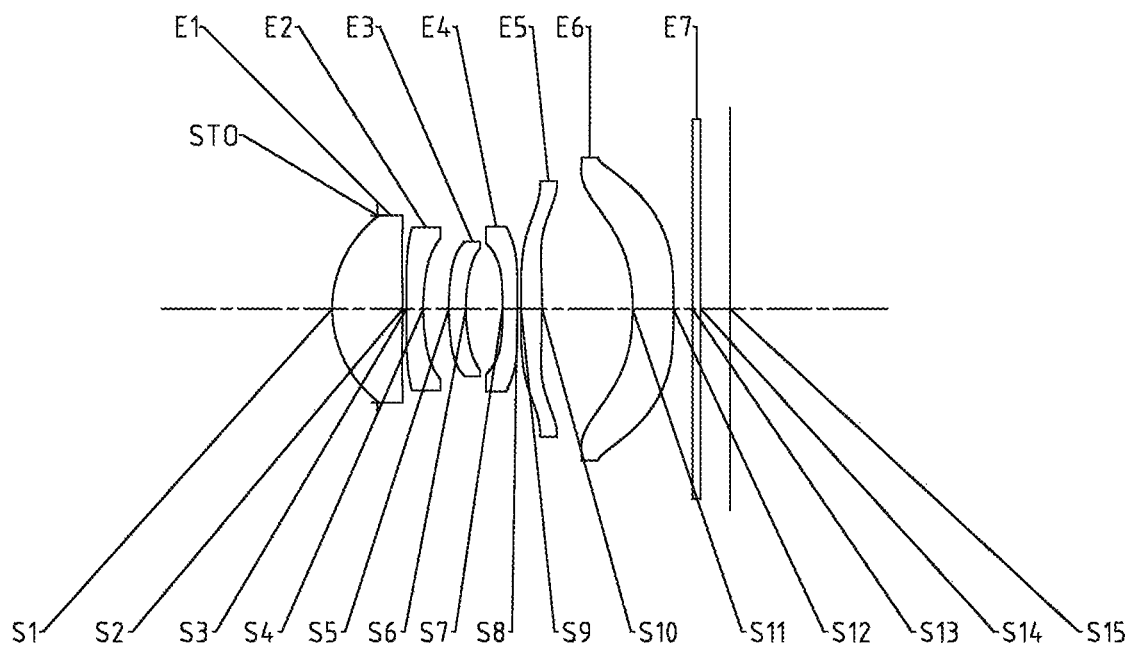
Fig. 19

OPTICAL IMAGING LENS ASSEMBLY

CROSS-REFERENCE TO RELATED APPLICATION

The present patent application is a continuation of International Application No. PCT/CN2018/114513, filed on Nov. 8, 2018, which claims priority to Chinese Patent Application No. 201810290945.X, filed before the China National Intellectual Property Administration (CNIPA) on Apr. 3, 2018. Both of the aforementioned patent applications are hereby incorporated by reference in their entireties.

TECHNICAL FIELD

The present disclosure relates to an optical imaging lens assembly, and more specifically, relates to an optical imaging lens assembly including six lenses.

BACKGROUND

With the rapid development of portable electronic products, such as smart phones, people hope that the needs of shooting the object at distant can be met with the portable electronic devices when they are shooting in the field, and hope the portable electronic devices can achieve an effect of highlighting the subject and blurring the background. This requires the imaging lens assemblies have the characteristics of telephoto while having the characteristics of miniaturization and high imaging quality. However, for the existing telephoto lens assemblies, the number of lenses is usually increased to achieve a high imaging quality, resulting in a larger size. Therefore, the existing telephoto lens assemblies cannot simultaneously meet the requirements of telephoto, miniaturization, and high imaging quality.

SUMMARY

The present disclosure provides an optical imaging lens assembly that is applicable to portable electronic products and at least solves or partially addresses at least one of the above disadvantages of the prior art.

In one aspect, the present disclosure provides an optical imaging lens assembly which includes, sequentially from an object side to an image side along an optical axis, a first lens, a second lens, a third lens, a fourth lens, a fifth lens, and a sixth lens. The first lens may have a positive refractive power, and both of an object-side surface and an image-side surface thereof may be convex surfaces; the second lens may have a negative refractive power; the third lens may have a negative refractive power, and an image-side surface thereof may be a concave surface; the fourth lens has a refractive power; the fifth lens has a refractive power, and an image-side surface thereof may be a convex surface; and the sixth lens has a refractive power, and an object-side surface thereof may be a concave surface. Here, half of a maximal field-of-view HFOV of the optical imaging lens assembly may satisfy HFOV<30°.

In one embodiment, an effective focal length f1 of the first lens and a center thickness CT4 of the fourth lens along the optical axis may satisfy f1/CT4>11. Further, the effective focal length f1 of the first lens and the center thickness CT4 of the fourth lens along the optical axis may satisfy 11<f1/CT4<15.

In one embodiment, a radius of curvature R2 of the image-side surface of the first lens and a radius of curvature R1 of the object-side surface of the first lens may satisfy 1<(R2−R1)/(R2+R1)<1.5.

In one embodiment, a total effective focal length f of the optical imaging lens assembly and an effective focal length f1 of the first lens may satisfy 2<f/f1<2.5.

In one embodiment, a total effective focal length f of the optical imaging lens assembly and an effective focal length f2 of the second lens may satisfy −1.3<f/f2<−0.3.

In one embodiment, a radius of curvature R6 of the image-side surface of the third lens and a total effective focal length f of the optical imaging lens assembly may satisfy 0.2<R6/f<1.2.

In one embodiment, an effective focal length f3 of the third lens and a total effective focal length f of the optical imaging lens assembly may satisfy −2.2<f3/f<−0.6.

In one embodiment, a radius of curvature R10 of the image-side surface of the fifth lens and a radius of curvature R11 of the object-side surface of the sixth lens may satisfy 0.5<(R10−R11)/(R10+R11)<1.5.

In one embodiment, the sixth lens may have a negative refractive power, and an effective focal length f6 of the sixth lens and a total effective focal length f of the optical imaging lens assembly may satisfy −1.6<f6/f<−0.6.

In one embodiment, a spaced interval T56 between the fifth lens and the sixth lens along the optical axis and a center thickness CT6 of the sixth lens along the optical axis may satisfy 2<T56/CT6<3.5.

In one embodiment, a center thickness CT1 of the first lens along the optical axis and a center thickness CT3 of the third lens along the optical axis may satisfy 3.7<CT1/CT3<4.7.

In one embodiment, a spaced interval T23 between the second lens and the third lens along the optical axis and a center thickness CT2 of the second lens along the optical axis may satisfy 0.5<T23/CT2<1.8.

In one embodiment, a spaced interval T34 between the third lens and the fourth lens along the optical axis and a distance TTL along the optical axis from a center of the object-side surface of the first lens to an imaging plane of the optical imaging lens assembly may satisfy 0.5<T34/TTL*10<1.

In another aspect, the present disclosure provides an optical imaging lens assembly which includes, sequentially from an object side to an image side along an optical axis, a first lens, a second lens, a third lens, a fourth lens, a fifth lens, and a sixth lens. The first lens may have a positive refractive power, and both of an object-side surface and an image-side surface thereof may be convex surfaces; the second lens may have a negative refractive power; the third lens may have a negative refractive power, and an image-side surface thereof may be a concave surface; the fourth lens has a refractive power; the fifth lens has a refractive power, and an image-side surface thereof may be a convex surface; and the sixth lens has a refractive power, and an object-side surface thereof may be a concave surface. Here, an effective focal length f3 of the third lens and a total effective focal length f of the optical imaging lens assembly may satisfy −2.2<f3/f<−0.6.

In another aspect, the present disclosure provides an optical imaging lens assembly which includes, sequentially from an object side to an image side along an optical axis, a first lens, a second lens, a third lens, a fourth lens, a fifth lens, and a sixth lens. The first lens may have a positive refractive power, and both of an object-side surface and an image-side surface thereof may be convex surfaces; the second lens may have a negative refractive power; the third lens may have a negative refractive power, and an image-side surface thereof may be a concave surface; the fourth lens has a refractive power; the fifth lens has a refractive power, and an image-side surface thereof may be a convex surface; and the sixth lens has a refractive power, and an object-side surface thereof may be a concave surface. Here, a total effective focal length f of the optical imaging lens assembly and an effective focal length f1 of the first lens may satisfy 2<f/f1<2.5.

In yet another aspect, the present disclosure provides an optical imaging lens assembly which includes, sequentially from an object side to an image side along an optical axis, a first lens, a second lens, a third lens, a fourth lens, a fifth lens, and a sixth lens. The first lens may have a positive refractive power, and both of an object-side surface and an image-side surface thereof may be convex surfaces; the second lens may have a negative refractive power; the third lens may have a negative refractive power, and an image-side surface thereof may be a concave surface; the fourth lens has a refractive power; the fifth lens has a refractive power, and an image-side surface thereof may be a convex surface; and the sixth lens has a refractive power, and an object-side surface thereof may be a concave surface. Here, a spaced interval T56 between the fifth lens and the sixth lens along the optical axis and a center thickness CT6 of the sixth lens along the optical axis may satisfy 2<T56/CT6<3.5.

In yet another aspect, the present disclosure provides an optical imaging lens assembly which includes, sequentially from an object side to an image side along an optical axis, a first lens, a second lens, a third lens, a fourth lens, a fifth lens, and a sixth lens. The first lens may have a positive refractive power, and both of an object-side surface and an image-side surface thereof may be convex surfaces; the second lens may have a negative refractive power; the third lens may have a negative refractive power, and an image-side surface thereof may be a concave surface; the fourth lens has a refractive power; the fifth lens has a refractive power, and an image-side surface thereof may be a convex surface; and the sixth lens has a refractive power, and an object-side surface thereof may be a concave surface. Here, a spaced interval T23 between the second lens and the third lens along the optical axis and a center thickness CT2 of the second lens along the optical axis may satisfy 0.5<T23/CT2<1.8.

In yet another aspect, the present disclosure provides an optical imaging lens assembly which includes, sequentially from an object side to an image side along an optical axis, a first lens, a second lens, a third lens, a fourth lens, a fifth lens, and a sixth lens. The first lens may have a positive refractive power, and both of an object-side surface and an image-side surface thereof may be convex surfaces; the second lens may have a negative refractive power; the third lens may have a negative refractive power, and an image-side surface thereof may be a concave surface; the fourth lens has a refractive power; the fifth lens has a refractive power, and an image-side surface thereof may be a convex surface; and the sixth lens has a refractive power, and an object-side surface thereof may be a concave surface. Here, a radius of curvature R10 of the image-side surface of the fifth lens and a radius of curvature R11 of the object-side surface of the sixth lens may satisfy 0.5<(R10−R11)/(R10+R11)<1.5.

The present disclosure employs a plurality of (for example, six) lenses, and the optical imaging lens assembly has at least one advantageous effect such as miniaturization, long focal length and high image quality and the like by rationally assigning the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the accompanying drawings:

FIG. 5 illustrates a schematic structural view of an optical imaging lens assembly according to Example 3 of the present disclosure;

FIGS. 6A to 6D illustrate a longitudinal aberration curve, an astigmatic curve, a distortion curve and a lateral color curve of the optical imaging lens assembly of the Example 3, respectively;

FIGS. 10A to 10D illustrate a longitudinal aberration curve, an astigmatic curve, a distortion curve and a lateral color curve of the optical imaging lens assembly of the Example 5, respectively;

FIG. 11 illustrates a schematic structural view of an optical imaging lens assembly according to Example 6 of the present disclosure;

FIGS. 18A to 18D illustrate a longitudinal aberration curve, an astigmatic curve, a distortion curve and a lateral color curve of the optical imaging lens assembly of the Example 9, respectively;

FIG. 19 illustrates a schematic structural view of an optical imaging lens assembly according to Example 10 of the present disclosure.

DETAILED DESCRIPTION OF EMBODIMENTS

Figure 1:
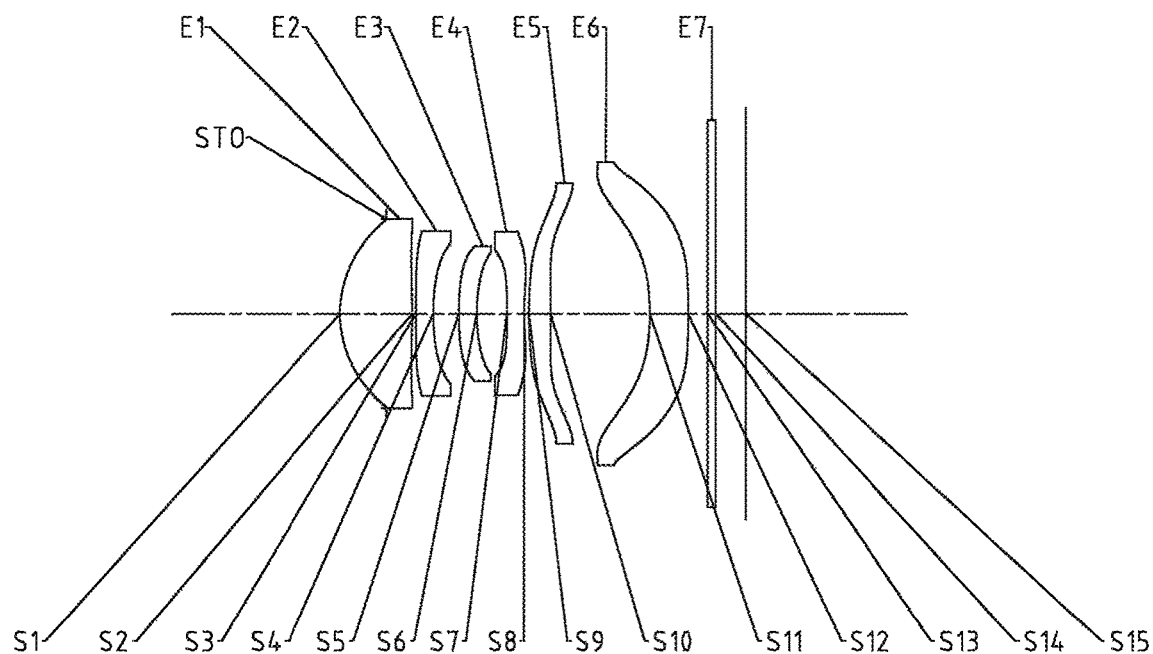
FIG. 1 illustrates a schematic structural view of an optical imaging lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface close to the object is referred to as an object-side surface of the lens, and the surface close to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, six lenses having refractive power, i.e. a first lens, a second lens, a third lens, a fourth lens, a fifth lens and a sixth lens. The six lenses are arranged sequentially from an object side to an image side along an optical axis.

In an exemplary embodiment, the first lens may have a positive refractive power, an object-side surface thereof may be a convex surface, and an image-side surface thereof may be a convex surface; the second lens may have a negative refractive power; the third lens may have a negative refractive power, and an image-side surface thereof may be a concave surface; the fourth lens has a positive refractive power or a negative refractive power; the fifth lens has a positive refractive power or a negative refractive power, and an image-side surface thereof may be a convex surface; and the sixth lens has a positive refractive power or a negative refractive power, and an image-side surface thereof may be a concave surface.

In an exemplary embodiment, an image-side surface of the fourth lens may be a concave surface.

In an exemplary embodiment, the sixth lens may have a negative refractive power, and an image-side surface thereof may be a concave surface.

In an exemplary embodiment, the optical imaging lens assembly according to the present disclosure may satisfy: HFOV<30°, where HFOV is half of a maximal field-of-view of the optical imaging lens assembly. More specifically, HFOV may further satisfy: HFOV<25°, for example, 24.1°≤HFOV≤24.2°. By reasonably controlling the half of a maximal field-of-view of the optical imaging lens assembly, the optical system meets the telephoto characteristics and has a good ability to correct aberrations.

In an exemplary embodiment, the optical imaging lens assembly according to the present disclosure may satisfy: f1/CT4>11, where f1 is an effective focal length of the first lens and CT4 is a center thickness of the fourth lens along the optical axis. More specifically, f1 and CT4 may further satisfy: 11<f1/CT4<15, for example, 11.20≤f1/CT4≤13.45. By reasonably controlling the ratio of the effective focal length of the first lens to the center thickness of the fourth lens, the optical system satisfies the telephoto characteristic and has a better ability to balance aberrations. Further, by reasonably controlling the deflection angle of the chief ray, the matching degree between the lens assembly and the chip is improved, which is beneficial to adjust the structure of the optical system.

In an exemplary embodiment, the optical imaging lens assembly according to the present disclosure may satisfy: −1.3<f/f2<−0.3, where f is a total effective focal length of the optical imaging lens assembly and f2 is an effective focal length of the second lens. More specifically, f and f2 may further satisfy: $-1.18 \leq f/f2 \leq -0.47$. Reasonably setting the effective focal length of the second lens helps to increase the focal length of the optical system and realize the telephoto characteristic of the lens assembly. Further, by reasonably setting the effective focal length of the second lens, the position of the light may be effectively adjusted, which is beneficial to shorten the total length of the optical imaging lens assembly.

In an exemplary embodiment, the optical imaging lens assembly according to the present disclosure may satisfy: $-2.2 < f3/f < -0.6$, where f3 is an effective focal length of the third lens and f is a total effective focal length of the optical imaging lens assembly. More specifically, f3 and f may further satisfy: $-2.11 \leq f3/f \leq -0.73$. By reasonably configuring the effective focal length of the third lens, the telephoto characteristic of the lens assembly may be achieved while the aberrations are corrected. Further, the total length of the optical system is effectively shortened to meet the requirements for thinness and lightness.

In an exemplary embodiment, the optical imaging lens assembly according to the present disclosure may satisfy: $2 < f/f1 < 2.5$, where f is a total effective focal length of the optical imaging lens assembly and f1 is an effective focal length of the first lens. More specifically, f and f1 may further satisfy: $2.26 \leq f/f1 \leq 2.35$. Reasonably setting the effective focal length of the first lens helps to achieve the telephoto characteristic of the lens assembly. Moreover, by reasonably controlling the refractive power of the first lens, the ability of the imaging system to converge light may be improved, and the focus position of the light may be adjusted, thereby helping to shorten the total length of the system.

In an exemplary embodiment, the optical imaging lens assembly according to the present disclosure may satisfy: $1 < (R2-R1)/(R2+R1) < 1.5$, where R2 is a radius of curvature of the image-side surface of the first lens and R1 is a radius of curvature of the object-side surface of the first lens. More specifically, R2 and R1 may further satisfy: $1.15 \leq (R2-R1)/(R2+R1) \leq 1.45$. Reasonably assigning the radius of curvature of the object-side surface and the image-side surface of the first lens helps to adjust the refractive power distribution on both sides of the first lens, and helps to improve the ability of the optical system to compensate astigmatic.

In an exemplary embodiment, the optical imaging lens assembly according to the present disclosure may satisfy: $0.2 < R6/f < 1.2$, where R6 is a radius of curvature of the image-side surface of the third lens and f is a total effective focal length of the optical imaging lens assembly. More specifically, R6 and f may further satisfy: $0.31 \leq R6/f \leq 1.03$. By reasonably arranging the radius of curvature of the image-side surface of the third lens, the astigmatic of the system may be effectively compensated, the back focal length of the system is shortened, and the miniaturization of the optical system is further ensured.

In an exemplary embodiment, the optical imaging lens assembly according to the present disclosure may satisfy: $3.7 < CT1/CT3 < 4.7$, where CT1 is a center thickness of the first lens along the optical axis and CT3 is a center thickness of the third lens along the optical axis. More specifically, CT1 and CT3 may further satisfy: $3.91 \leq CT1/CT3 \leq 4.52$. Reasonably controlling the ratio of the center thickness of the first lens to the center thickness of the third lens may effectively reduce the size of the optical system, and avoid the excessively large system volume. At the same time, the assembly difficulty of the lens may be effectively reduced and a higher space utilization rate may be achieved.

In an exemplary embodiment, the optical imaging lens assembly according to the present disclosure may satisfy: $2 < T56/CT6 < 3.5$, where T56 is a spaced interval between the fifth lens and the sixth lens along the optical axis and CT6 is a center thickness of the sixth lens along the optical axis. More specifically, T56 and CT6 may further satisfy: $2.02 \leq T56/CT6 \leq 3.39$. By reasonably controlling the ratio of the air interval between the fifth lens and the sixth lens along the optical axis to the center thickness of the sixth lens, the size of the system may be effectively reduced, and the telephoto characteristic of the lens may be achieved. At the same time, the structure of the system is advantageously adjusted, and the difficulty of lens processing and assembly is reduced.

In an exemplary embodiment, the optical imaging lens assembly according to the present disclosure may satisfy: $-1.6 < f6/f < -0.6$, where f6 is an effective focal length of the sixth lens and f is a total effective focal length of the optical imaging lens assembly. More specifically, f6 and f may further satisfy: $-1.3 < f6/f < -1.0$, for example, $-1.26 \leq f6/f \leq -1.03$. Reasonably setting the effective focal length of the sixth lens is beneficial to increase the focal length of the optical system and ensure the telephoto characteristic of the system.

In an exemplary embodiment, the optical imaging lens assembly according to the present disclosure may satisfy: $0.5 < T34/TTL*10 < 1$, where T34 is a spaced interval between the third lens and the fourth lens along the optical axis, and TTL is a distance along the optical axis from a center of the object-side surface of the first lens to an imaging plane of the optical imaging lens assembly. More specifically, T34 and TTL may further satisfy: $0.64 \leq T34/TTL*10 \leq 0.92$. Reasonably controlling the ratio of the air interval along the optical axis between the third lens and the fourth lens to the axial distance from the object-side surface of the first lens to the imaging plane helps to ensure that the optical system has light and thin characteristics and telephoto characteristics, so that the imaging lens assembly may be used in high-performance portable electronic products with a wide-angle lens.

In an exemplary embodiment, the optical imaging lens assembly according to the present disclosure may satisfy: $0.5 < T23/CT2 < 1.8$, where T23 is a spaced interval between the second lens and the third lens along the optical axis, and CT2 is a center thickness of the second lens along the optical axis. More specifically, T23 and CT2 may further satisfy: $0.58 \leq T23/CT2 \leq 1.76$. By reasonably controlling the ratio of the air interval along the optical axis between the second lens and the third lens to the center thickness of the second lens, a sufficient space is provided between lenses, so that the lens surface may have a higher degree of freedom of change, and thus improve the system's ability to correct astigmatic and field curvature.

In an exemplary embodiment, the optical imaging lens assembly according to the present disclosure may satisfy: $0.5 < (R10-R11)/(R10+R11) < 1.5$, where R10 is a radius of curvature of the image-side surface of the fifth lens and R11 is a radius of curvature of an object-side surface of the sixth lens. More specifically, R10 and R11 may further satisfy: $0.6 < (R10-R11)/(R10+R11) < 1.1$, for example, $0.65 \leq (R10-R11)/(R10+R11) \leq 1.00$. Reasonably distributing the radius of curvature of the image-side surface of the fifth lens and the object-side surface of the sixth lens, and making the image-side surface of the fifth lens convex and the object-side surface of the sixth lens concave, helps the optical system to better match the chief ray angle of the chip.

In an exemplary embodiment, the optical imaging lens assembly described above may further include at least one stop to improve the imaging quality of the lens assembly. The stop may be disposed at any position as needed, for example, the stop may be disposed between the object side and the first lens.

Optionally, the above optical imaging lens assembly may further include an optical filter for correcting the color deviation and/or a protective glass for protecting the photosensitive element on the imaging plane.

The disclosure proposes a six-piece telephoto lens assembly that uses aspheric lens. The wide-angle and telephoto lens assembly cooperate to achieve the purpose of zooming, so as to obtain an image with suitable magnification and good quality in the form of autofocus, thereby making the lens suitable for shooting objects at distant. At the same time, the lens assembly of the present disclosure by properly assigning the refractive power of each lens, the surface shape, the center thickness of each lens, and spaced intervals on the optical axis between the lenses, the size and the sensitivity of the imaging lens assembly may be effectively reduced, and the workability of the imaging lens assembly may be improved, such that the optical imaging lens assembly is more advantageous for production processing and may be applied to portable electronic products.

In the embodiments of the present disclosure, at least one of the surfaces of each lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking six lenses as an example, the optical imaging lens assembly is not limited to include six lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15.

Table 1 shows surface type, radius of curvature, thickness, material and conic coefficient of each lens of the optical imaging lens assembly in example 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.6178 | | | |
| S1 | aspheric | 1.5523 | 0.9600 | 1.55 | 56.1 | −0.0781 |
| S2 | aspheric | −18.0698 | 0.0500 | | | −99.0000 |
| S3 | aspheric | 22.9399 | 0.2300 | 1.67 | 20.4 | 2.7268 |
| S4 | aspheric | 2.9739 | 0.3404 | | | 0.2266 |
| S5 | aspheric | 4.1947 | 0.2393 | 1.55 | 56.1 | 6.8529 |
| S6 | aspheric | 2.5304 | 0.4015 | | | −1.9287 |
| S7 | aspheric | 286.4851 | 0.2300 | 1.55 | 56.1 | −99.0000 |
| S8 | aspheric | 4.3026 | 0.0637 | | | −31.7901 |
| S9 | aspheric | 6.4623 | 0.2886 | 1.65 | 23.5 | 9.8273 |
| S10 | aspheric | −37.1933 | 1.3270 | | | −99.0000 |
| S11 | aspheric | −3.6274 | 0.5094 | 1.55 | 56.1 | −47.5520 |
| S12 | aspheric | 1000.0000 | 0.2605 | | | 99.0000 |
| S13 | spherical | infinite | 0.1100 | 1.52 | 64.2 | |

TABLE 1-continued

| Surface number | Surface type | Radius of curvature | Thickness | Material Refractive index | Abbe number | Conic coefficient |
|---|---|---|---|---|---|---|
| S14 | spherical | infinite | 0.3995 | | | |
| S15 | spherical | infinite | | | | |

As can be seen from Table 1, the object-side surface and the image-side surface of any one of the first lens E1 to the sixth lens E6 are aspheric. In this example, the surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14, and A16 applicable to each aspheric surface S1-S12 in example 1.

f/f2=−1.18, where f is the total effective focal length of the optical imaging lens assembly, and f2 is the effective focal length of the second lens E2;

f3/f=−2.02, where f3 is the effective focal length of the third lens E3, and f is the total effective focal length of the optical imaging lens assembly;

f/f1=2.29, where f is the total effective focal length of the optical imaging lens assembly, and f1 is the effective focal length of the first lens E1;

(R2−R1)/(R2+R1)=1.19, where R2 is a radius of curvature of the image-side surface S2 of the first lens E1, and R1 is a radius of curvature of the object-side surface S1 of the first lens E1;

R6/f=0.42, where R6 is a radius of curvature of the image-side surface S6 of the third lens E3, and f is the total effective focal length of the optical imaging lens assembly;

CT1/CT3=4.01, where CT1 is a center thickness of the first lens E1 along the optical axis, and CT3 is a center thickness of the third lens E3 along the optical axis;

TABLE 2

| Surface number | A4 | A6 | A8 | A10 | A12 | A14 | A16 |
|---|---|---|---|---|---|---|---|
| S1 | −3.3000E−05 | −3.8000E−04 | −1.3200E−03 | 1.8850E−03 | −1.1200E−03 | 0.0000E+00 | 0.0000E+00 |
| S2 | −3.4060E−02 | 1.6155E−01 | −1.7972E−01 | 9.0023E−02 | −1.7410E−02 | 0.0000E+00 | 0.0000E+00 |
| S3 | −7.3060E−02 | 2.8158E−01 | −2.9510E−01 | 1.4921E−01 | −3.0130E−02 | 0.0000E+00 | 0.0000E+00 |
| S4 | −2.6070E−02 | 2.2900E−01 | −2.1304E−01 | 2.0822E−01 | −1.0240E−01 | 0.0000E+00 | 0.0000E+00 |
| S5 | 3.4922E−02 | 1.0536E−01 | 3.0041E−02 | 3.8359E−02 | −2.3730E−02 | 0.0000E+00 | 0.0000E+00 |
| S6 | 4.9369E−02 | −4.3800E−03 | 2.7969E−01 | −3.3530E−01 | 3.1260E−01 | 0.0000E+00 | 0.0000E+00 |
| S7 | −2.2039E−01 | −2.1000E−01 | 1.1998E−01 | 1.8118E−01 | −2.3412E−01 | 0.0000E+00 | 0.0000E+00 |
| S8 | −9.8820E−02 | −2.5617E−01 | 4.0034E−01 | −2.4276E−01 | 5.7410E−02 | 0.0000E+00 | 0.0000E+00 |
| S9 | −2.3540E−01 | 1.1236E−01 | −7.7670E−02 | 2.0927E−02 | −2.1400E−03 | 0.0000E+00 | 0.0000E+00 |
| S10 | −2.9630E−02 | 1.7046E−01 | −1.0765E−01 | 2.7372E−02 | −2.6500E−03 | 0.0000E+00 | 0.0000E+00 |
| S11 | −2.4012E−01 | 1.8785E−01 | −1.1397E−01 | 4.4626E−02 | −9.6600E−03 | 1.0820E−03 | −5.0674E−05 |
| S12 | −1.6920E−01 | 8.6130E−02 | −3.2230E−02 | 4.1790E−03 | 1.3340E−03 | −5.7000E−04 | 6.1371E−05 |

Table 3 shows effective focal lengths f1 to f6 of respective lens, a total effective focal length f of the optical imaging lens assembly, a distance TTL along the optical axis from a center of the object-side surface S1 of the first lens E1 to the imaging plane S15 and half of a maximal field-of-view HFOV of the optical imaging lens assembly in example 1.

TABLE 3

| f1 (mm) | 2.66 | f6 (mm) | −6.61 |
|---|---|---|---|
| f2 (mm) | −5.14 | f (mm) | 6.08 |
| f3 (mm) | −12.29 | TTL (mm) | 5.41 |
| f4 (mm) | −8.00 | HFOV (°) | 24.1 |
| f5 (mm) | 8.56 | | |

The optical imaging lens assembly in example 1 satisfies the followings:

f1/CT4=11.57, where f1 is the effective focal length of the first lens E1, and CT4 is a center thickness of the fourth lens E4 along the optical axis;

T56/CT6=2.61, where T56 is a spaced interval between the fifth lens E5 and the sixth lens E6 along the optical axis, and CT6 is a center thickness of the sixth lens E6 along the optical axis;

f6/f=−1.09, where f6 is the effective focal length of the sixth lens E6, and f is a total effective focal length of the optical imaging lens assembly;

T34/TTL*10=0.74, where T34 is a spaced interval between the third lens E3 and the fourth lens E4 along the optical axis, and TTL is the distance along the optical axis from the center of the object-side surface S1 of the first lens E1 to the imaging plane 515;

T23/CT2=1.48, where T23 is a spaced interval between the second lens E2 and the third lens E3 along the optical axis, and CT2 is a center thickness of the second lens E2 along the optical axis; and (R10−R11)/(R10+R11)=0.82, where R10 is a radius of curvature of the image-side surface S10 of the fifth lens E5, and R11 is a radius of curvature of the object-side surface S11 of the sixth lens E6.

Figure 2A:
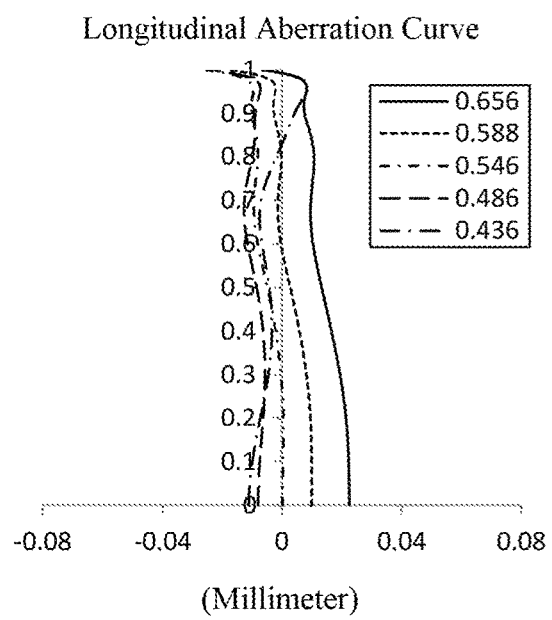
FIGS. 2A to 2D illustrate a longitudinal aberration curve, an astigmatic curve, a distortion curve and a lateral color curve of the optical imaging lens assembly of the Example 1, respectively.
Figure 2B:
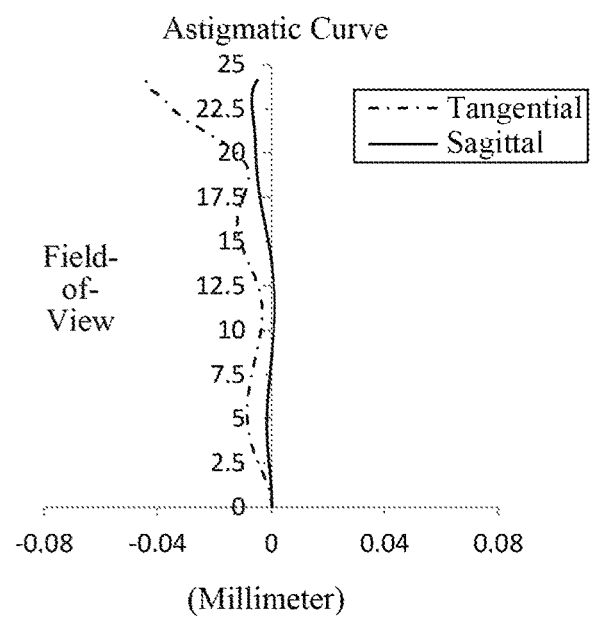
Figure 2C:
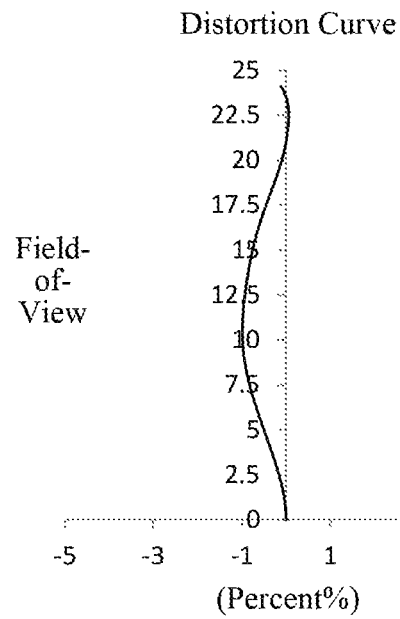
Figure 2D:
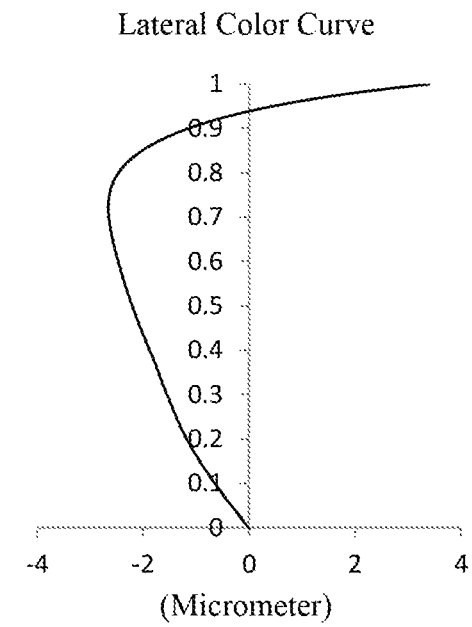

FIG. 2A illustrates a longitudinal aberration curve of the optical imaging lens assembly according to example 1, representing deviations of focal points converged by light of different wavelengths after passing through the optical imaging lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion at different FOVs. FIG. 2D illustrates a lateral color curve of the optical imaging lens assembly according to example 1, representing deviations of different image heights on an imaging plane after light passes through the optical imaging lens assembly. It can be seen from FIG. 2A to FIG. 2D that the optical imaging lens assembly provided in example 1 may achieve good image quality.

Example 2

Figure 3:
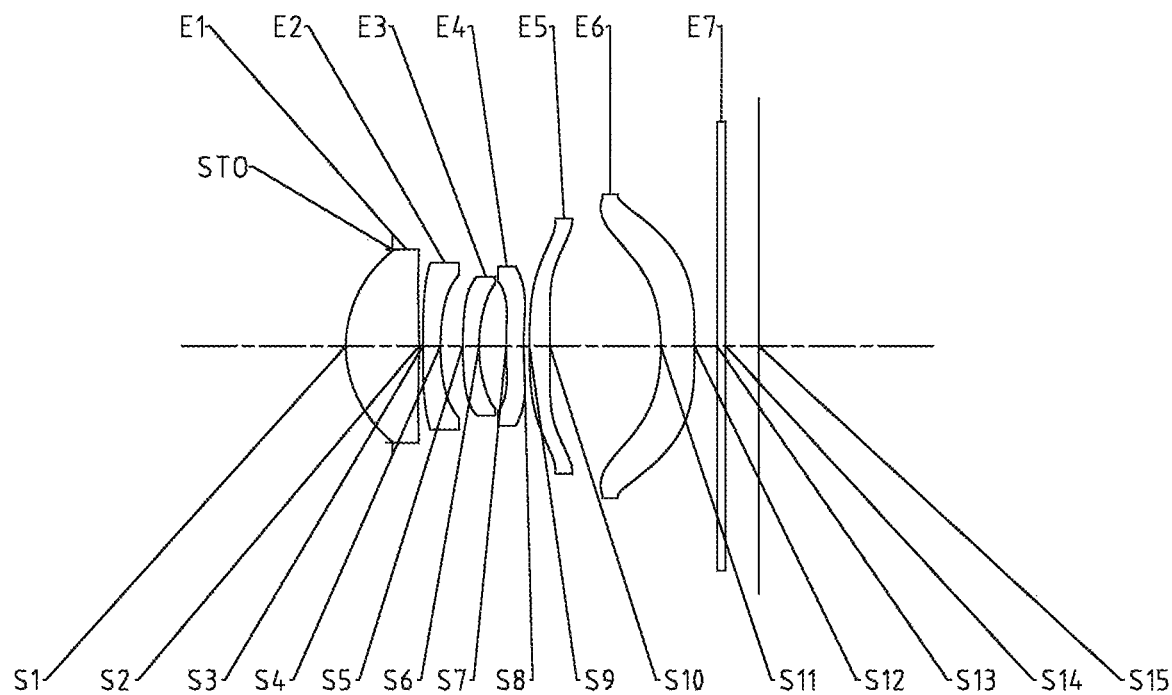
FIG. 3 illustrates a schematic structural view of an optical imaging lens assembly according to Example 2 of the present disclosure.

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane 515, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15.

Table 4 shows surface type, radius of curvature, thickness, material and conic coefficient of each lens of the optical imaging lens assembly in example 2, wherein the units for the radius of curvature and the thickness are millimeter (mm).

TABLE 4

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.6124 | | | |
| S1 | aspheric | 1.5629 | 0.9600 | 1.55 | 56.1 | −0.0740 |
| S2 | aspheric | −16.9173 | 0.0500 | | | −55.7248 |
| S3 | aspheric | 12.5786 | 0.2300 | 1.67 | 20.4 | −23.0595 |
| S4 | aspheric | 3.0409 | 0.2925 | | | 1.9574 |
| S5 | aspheric | 5.4369 | 0.2122 | 1.55 | 56.1 | 5.0450 |
| S6 | aspheric | 1.8715 | 0.3557 | | | −3.7882 |
| S7 | aspheric | 5.2972 | 0.2300 | 1.55 | 56.1 | −55.8988 |
| S8 | aspheric | 5.2250 | 0.0736 | | | −36.2019 |
| S9 | aspheric | 8.5124 | 0.2683 | 1.65 | 23.5 | 21.7073 |
| S10 | aspheric | −3626.3500 | 1.4538 | | | −99.0000 |
| S11 | aspheric | −3.5527 | 0.4408 | 1.55 | 56.1 | −21.3043 |
| S12 | aspheric | 500.0000 | 0.2970 | | | −99.0000 |
| S13 | spherical | infinite | 0.1100 | 1.52 | 64.2 | |
| S14 | spherical | infinite | 0.4361 | | | |
| S15 | spherical | infinite | | | | |

As can be seen from Table 4, in example 2, the object-side surface and the image-side surface of any one of the first lens E1 to the sixth lens E6 are aspheric. Table 5 shows high-order coefficients applicable to each aspheric surface in example 2, wherein the surface shape of each aspheric surface may be defined by the formula (1) given in the above example 1.

TABLE 5

| Surface number | A4 | A6 | A8 | A10 | A12 | A14 | A16 |
|---|---|---|---|---|---|---|---|
| S1 | 3.1600E−04 | −8.0000E−04 | −8.0000E−04 | 1.9170E−03 | −1.1900E−03 | 0.0000E+00 | 0.0000E+00 |
| S2 | −3.5840E−02 | 1.5939E−01 | −1.7455E−01 | 8.6221E−02 | −1.6330E−02 | 0.0000E+00 | 0.0000E+00 |

TABLE 5-continued

| Surface number | A4 | A6 | A8 | A10 | A12 | A14 | A16 |
|---|---|---|---|---|---|---|---|
| S3 | −6.9000E−02 | 2.6589E−01 | −2.7525E−01 | 1.3444E−01 | −2.4800E−02 | 0.0000E+00 | 0.0000E+00 |
| S4 | −8.6700E−03 | 2.1138E−01 | −2.0394E−01 | 2.2975E−01 | −1.1336E−01 | 0.0000E+00 | 0.0000E+00 |
| S5 | 7.3240E−03 | 1.9937E−01 | −1.1949E−01 | 1.7858E−01 | −9.5380E−02 | 0.0000E+00 | 0.0000E+00 |
| S6 | −5.3200E−03 | 1.4525E−01 | −1.8200E−02 | 9.7920E−03 | 8.6850E−02 | 0.0000E+00 | 0.0000E+00 |
| S7 | −1.5937E−01 | −3.2480E−01 | 1.6759E−01 | 1.8962E−01 | −2.3655E−01 | 0.0000E+00 | 0.0000E+00 |
| S8 | −1.9280E−02 | −4.4455E−01 | 5.4896E−01 | −3.2035E−01 | 7.8567E−02 | 0.0000E+00 | 0.0000E+00 |
| S9 | 2.4841E−02 | 6.6141E−02 | −5.4530E−02 | 1.5923E−02 | −1.9400E−03 | 0.0000E+00 | 0.0000E+00 |
| S10 | −3.1630E−02 | 1.6581E−01 | −9.9830E−02 | 2.4071E−02 | −2.2800E−03 | 0.0000E+00 | 0.0000E+00 |
| S11 | −2.4119E−01 | 1.8629E−01 | −1.3797E−01 | 6.4838E−02 | −1.5660E−02 | 1.8080E−03 | −7.7255E−05 |
| S12 | −2.1927E−01 | 1.6014E−01 | −9.9120E−02 | 3.5682E−02 | −6.4600E−03 | 3.7600E−04 | 2.1533E−05 |

Table 6 shows effective focal lengths f1 to f6 of respective lens, a total effective focal length f of the optical imaging lens assembly, a distance TTL along the optical axis from a center of the object-side surface S1 of the first lens E1 to the imaging plane S15 and half of a maximal field-of-view HFOV of the optical imaging lens assembly in example 2.

TABLE 6

| f1 (mm) | 2.67 | f6 (mm) | −6.45 |
|---|---|---|---|
| f2 (mm) | −6.07 | f (mm) | 6.08 |
| f3 (mm) | −5.33 | TTL (mm) | 5.41 |
| f4 (mm) | 5539.00 | HFOV (°) | 24.1 |
| f5 (mm) | 13.17 | | |

Figure 4A:
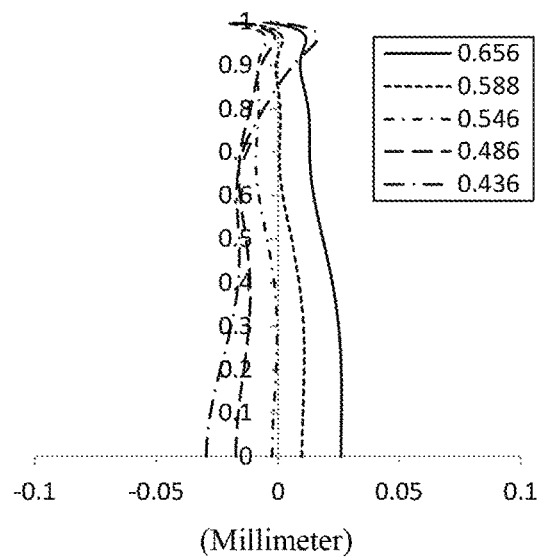
FIGS. 4A to 4D illustrate a longitudinal aberration curve, an astigmatic curve, a distortion curve and a lateral color curve of the optical imaging lens assembly of the Example 2, respectively.
Figure 4B:
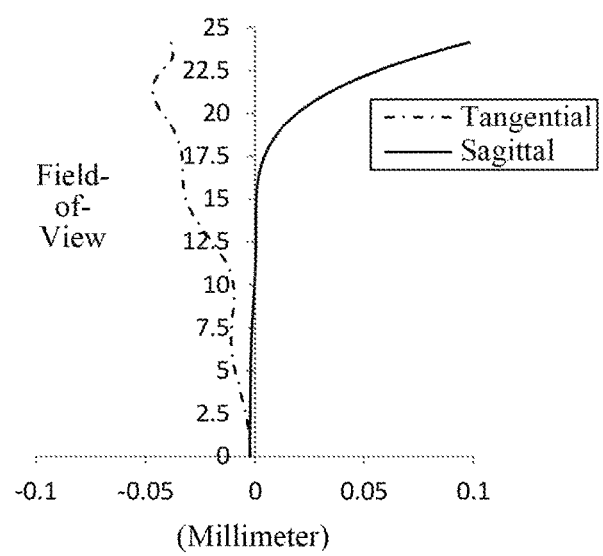
Figure 4C:
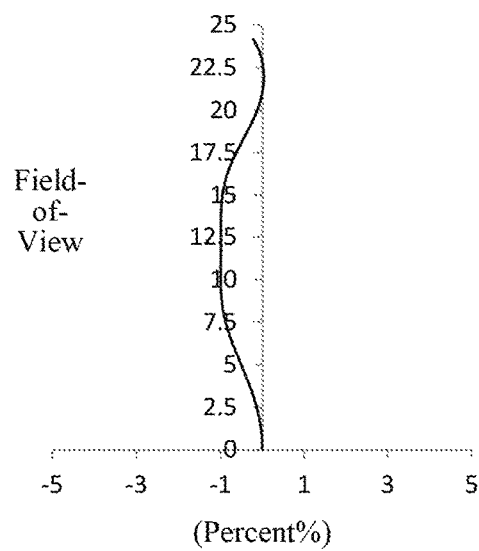
Figure 4D:
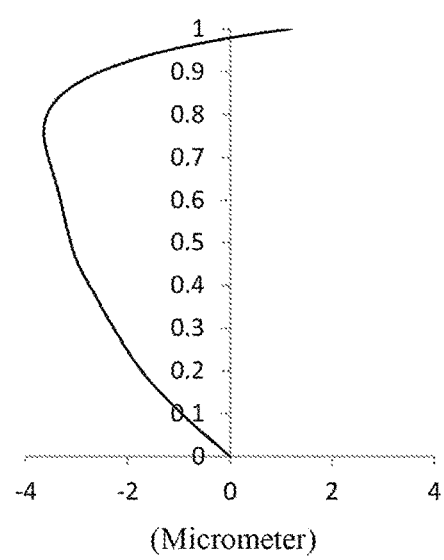

FIG. 4A illustrates a longitudinal aberration curve of the optical imaging lens assembly according to example 2, representing deviations of focal points converged by light of different wavelengths after passing through the optical imaging lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion at different FOVs. FIG. 4D illustrates a lateral color curve of the optical imaging lens assembly according to example 2, representing deviations of different image heights on an imaging plane after light passes through the optical imaging lens assembly. It can be seen from FIG. 4A to FIG. 4D that the optical imaging lens assembly provided in example 2 may achieve good image quality.

Example 3

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15.

Table 7 shows surface type, radius of curvature, thickness, material and conic coefficient of each lens of the optical imaging lens assembly in example 3, wherein the units for the radius of curvature and the thickness are millimeter (mm).

TABLE 7

| | | | | Material | | |
|---|---|---|---|---|---|---|
| Surface number | Surface type | Radius of curvature | Thickness | Refractive index | Abbe number | Conic coefficient |
| OBJ | spherical | infinite | infinite | | | |
| STO | spherical | infinite | −0.6137 | | | |
| S1 | aspheric | 1.5504 | 0.9594 | 1.55 | 56.1 | −0.0843 |
| S2 | aspheric | −20.3115 | 0.0500 | | | −55.3321 |
| S3 | aspheric | 50.0808 | 0.2300 | 1.67 | 20.4 | 99.0000 |
| S4 | aspheric | 3.6527 | 0.3197 | | | 0.7020 |
| S5 | aspheric | 4.8327 | 0.2425 | 1.55 | 56.1 | 11.1018 |
| S6 | aspheric | 2.5661 | 0.4585 | | | −1.9877 |
| S7 | aspheric | 31.3740 | 0.2300 | 1.55 | 56.1 | 99.0000 |

TABLE 7-continued

| Surface number | Surface type | Radius of curvature | Thickness | Material Refractive index | Abbe number | Conic coefficient |
|---|---|---|---|---|---|---|
| S8 | aspheric | 12.2752 | 0.0734 | | | 60.6271 |
| S9 | aspheric | −18.7314 | 0.2775 | 1.65 | 23.5 | 97.1000 |
| S10 | aspheric | −20.0000 | 1.2035 | | | −99.0000 |
| S11 | aspheric | −4.2363 | 0.5955 | 1.55 | 56.1 | −63.4877 |
| S12 | aspheric | 500.0000 | 0.2612 | | | 99.0000 |
| S13 | spherical | infinite | 0.1100 | 1.52 | 64.2 | |
| S14 | spherical | infinite | 0.3988 | | | |
| S15 | spherical | infinite | | | | |

As can be seen from Table 7, in example 3, the object-side surface and the image-side surface of any one of the first lens E1 to the sixth lens E6 are aspheric. Table 8 shows high-order coefficients applicable to each aspheric surface in example 3, wherein the surface shape of each aspheric surface may be defined by the formula (1) given in the above example 1.

TABLE 8

| Surface number | A4 | A6 | A8 | A10 | A12 | A14 | A16 |
|---|---|---|---|---|---|---|---|
| S1  | −6.9000E−04 | 1.0920E−03 | −3.3400E−03 | 3.6970E−03 | −1.9000E−03 | 0.0000E+00 | 0.0000E+00 |
| S2  | −4.4520E−02 | 1.9125E−01 | −2.2467E−01 | 1.1920E−01 | −2.4250E−02 | 0.0000E+00 | 0.0000E+00 |
| S3  | −7.5970E−02 | 3.0284E−01 | −3.4380E−01 | 1.8971E−01 | −4.1010E−02 | 0.0000E+00 | 0.0000E+00 |
| S4  | −1.9600E−02 | 2.2650E−01 | −2.3564E−01 | 2.3608E−01 | −1.1041E−01 | 0.0000E+00 | 0.0000E+00 |
| S5  | 3.5518E−02 | 1.0623E−01 | 7.3083E−02 | −3.4290E−02 | 2.0502E−02 | 0.0000E+00 | 0.0000E+00 |
| S6  | 4.2271E−02 | −4.6450E−02 | 4.9789E−01 | −7.0055E−01 | 5.6414E−01 | 0.0000E+00 | 0.0000E+00 |
| S7  | −1.2636E−01 | −5.4103E−01 | 3.5651E−01 | 2.3563E−01 | −3.3430E−01 | 0.0000E+00 | 0.0000E+00 |
| S8  | 2.3925E−01 | −9.5874E−01 | 1.0848E+00 | −5.7816E−01 | 1.2128E−01 | 0.0000E+00 | 0.0000E+00 |
| S9  | 1.7629E−01 | −2.3315E−01 | 2.2210E−01 | −1.0567E−01 | 1.8185E−02 | 0.0000E+00 | 0.0000E+00 |
| S10 | −7.4370E−02 | 1.1135E−01 | −1.6040E−02 | −1.4270E−02 | 3.5320E−03 | 0.0000E+00 | 0.0000E+00 |
| S11 | −2.4320E−01 | 2.1512E−01 | −1.8506E−01 | 1.0085E−01 | −2.9450E−02 | 4.3560E−03 | −2.5937E−04 |
| S12 | −1.8846E−01 | 1.3558E−01 | −9.0130E−02 | 3.5636E−02 | −7.6900E−03 | 7.9300E−04 | −2.4734E−05 |

Table 9 shows effective focal lengths f1 to f6 of respective lens, a total effective focal length f of the optical imaging lens assembly, a distance TTL along the optical axis from a center of the object-side surface S1 of the first lens E1 to the imaging plane S15 and half of a maximal field-of-view HFOV of the optical imaging lens assembly in example 3.

TABLE 9

| f1 (mm) | 2.68 | f6 (mm) | −7.68 |
|---|---|---|---|
| f2 (mm) | −5.91 | f (mm) | 6.08 |
| f3 (mm) | −10.40 | TTL (mm) | 5.41 |
| f4 (mm) | −37.06 | HFOV (°) | 24.2 |
| f5 (mm) | −500.81 | | |

Figure 6C:
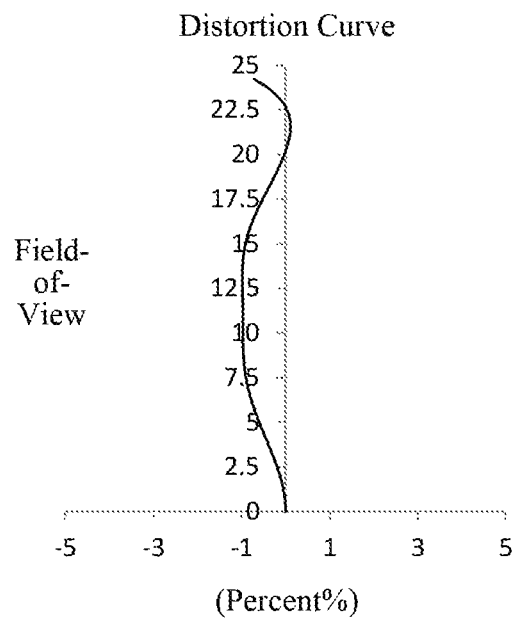
Figure 6D:
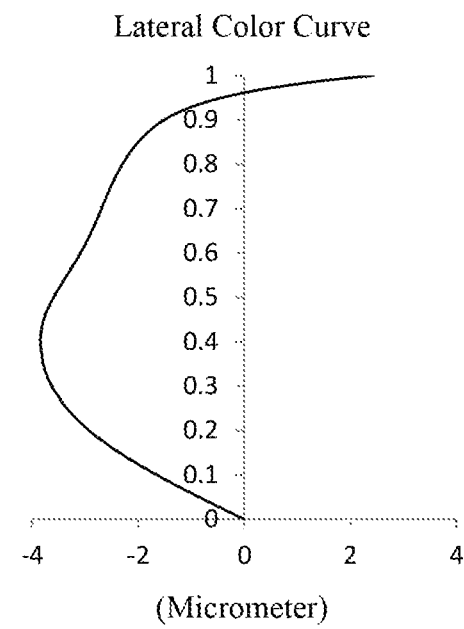

FIG. 6A illustrates a longitudinal aberration curve of the optical imaging lens assembly according to example 3, representing deviations of focal points converged by light of different wavelengths after passing through the optical imaging lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion at different FOVs. FIG. 6D illustrates a lateral color curve of the optical imaging lens assembly according to example 3, representing deviations of different image heights on an imaging plane after light passes through the optical imaging lens assembly. It can be seen from FIG. 6A to FIG. 6D that the optical imaging lens assembly provided in example 3 may achieve good image quality.

Example 4

Figure 7:
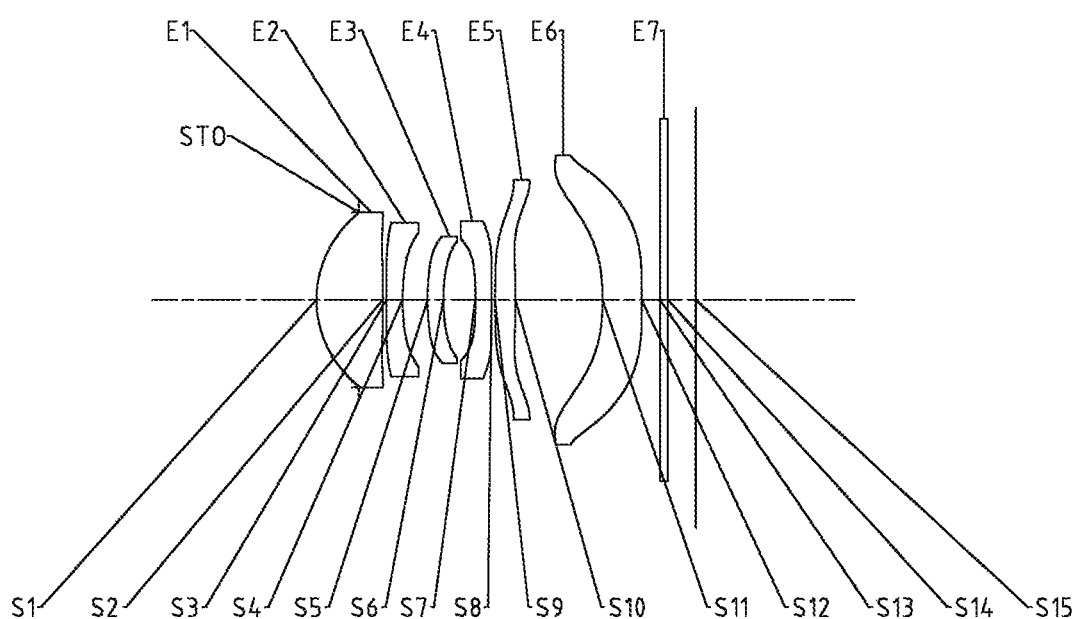
FIG. 7 illustrates a schematic structural view of an optical imaging lens assembly according to Example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15.

Table 10 shows surface type, radius of curvature, thickness, material and conic coefficient of each lens of the optical imaging lens assembly in example 4, wherein the units for the radius of curvature and the thickness are millimeter (mm).

TABLE 10

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.6025 | | | |
| S1 | aspheric | 1.5382 | 0.9482 | 1.55 | 56.1 | −0.0790 |
| S2 | aspheric | −19.6359 | 0.0500 | | | 35.1466 |
| S3 | aspheric | 38.2514 | 0.2300 | 1.67 | 20.4 | 99.0000 |
| S4 | aspheric | 3.2613 | 0.3582 | | | 1.1944 |
| S5 | aspheric | 4.3785 | 0.2236 | 1.55 | 56.1 | 8.4384 |
| S6 | aspheric | 2.6492 | 0.4573 | | | −1.6601 |
| S7 | aspheric | −7.8831 | 0.2300 | 1.55 | 56.1 | −99.0000 |
| S8 | aspheric | 33.5598 | 0.0500 | | | −99.0000 |
| S9 | aspheric | 21.0806 | 0.2911 | 1.65 | 23.5 | −99.0000 |
| S10 | aspheric | −20.0000 | 1.2436 | | | −99.0000 |
| S11 | aspheric | −3.7981 | 0.5581 | 1.55 | 56.1 | −59.0626 |
| S12 | aspheric | 500.0000 | 0.2605 | | | −99.0000 |
| S13 | spherical | infinite | 0.1100 | 1.52 | 64.2 | |
| S14 | spherical | infinite | 0.3995 | | | |
| S15 | spherical | infinite | | | | |

As can be seen from Table 10, in example 4, the object-side surface and the image-side surface of any one of the first lens E1 to the sixth lens E6 are aspheric. Table 11 shows high-order coefficients applicable to each aspheric surface in example 4, wherein the surface shape of each aspheric surface may be defined by the formula (1) given in the above example 1.

TABLE 11

| Surface number | A4 | A6 | A8 | A10 | A12 | A14 | A16 |
|---|---|---|---|---|---|---|---|
| S1 | 1.2200E−04 | −1.5100E−03 | 1.1600E−03 | −1.6000E−04 | −4.9000E−04 | 0.0000E+00 | 0.0000E+00 |
| S2 | −4.9690E−02 | 1.9895E−01 | −2.2320E−01 | 1.1665E−01 | −2.3940E−02 | 0.0000E+00 | 0.0000E+00 |
| S3 | −7.7670E−02 | 3.0537E−01 | −3.3110E−01 | 1.7633E−01 | −3.8700E−02 | 0.0000E+00 | 0.0000E+00 |
| S4 | −1.3860E−02 | 2.1075E−01 | −2.0011E−01 | 2.1021E−01 | −1.0881E−01 | 0.0000E+00 | 0.0000E+00 |
| S5 | 4.0115E−02 | 7.2387E−02 | 9.9832E−02 | −1.1340E−02 | −1.1550E−02 | 0.0000E+00 | 0.0000E+00 |
| S6 | 5.6109E−02 | −3.4790E−02 | 3.1746E−01 | −3.1533E−01 | 2.8285E−01 | 0.0000E+00 | 0.0000E+00 |
| S7 | −1.3070E−01 | −4.1840E−01 | 2.9452E−01 | 1.8113E−01 | −2.8977E−01 | 0.0000E+00 | 0.0000E+00 |
| S8 | 1.0044E−01 | −5.9602E−01 | 7.3001E−01 | −4.1760E−01 | 9.5158E−02 | 0.0000E+00 | 0.0000E+00 |
| S9 | 4.9088E−02 | 3.6659E−02 | −2.7790E−02 | 4.2650E−03 | −5.6000E−06 | 0.0000E+00 | 0.0000E+00 |
| S10 | −7.6150E−02 | 2.0392E−01 | −1.1500E−01 | 2.6777E−02 | −2.4000E−03 | 0.0000E+00 | 0.0000E+00 |
| S11 | −2.4549E−01 | 1.8184E−01 | −9.8340E−02 | 3.4200E−02 | −6.2800E−03 | 5.1500E−04 | −1.0951E−05 |
| S12 | −1.6058E−01 | 6.6488E−02 | −1.4330E−02 | −3.3300E−03 | 2.8780E−03 | −6.9000E−04 | 6.0583E−05 |

Table 12 shows effective focal lengths f1 to f6 of respective lens, a total effective focal length f of the optical imaging lens assembly, a distance TTL along the optical axis from a center of the object-side surface S1 of the first lens E1 to the imaging plane S15 and half of a maximal field-of-view HFOV of the optical imaging lens assembly in example 4.

TABLE 12

| f1 (mm) | 2.65 | f6 (mm) | −6.89 |
| f2 (mm) | −5.36 | f (mm) | 6.08 |
| f3 (mm) | −12.86 | TTL (mm) | 5.41 |
| f4 (mm) | −11.66 | HFOV (°) | 24.2 |
| f5 (mm) | 15.96 | | |

Figure 8A:
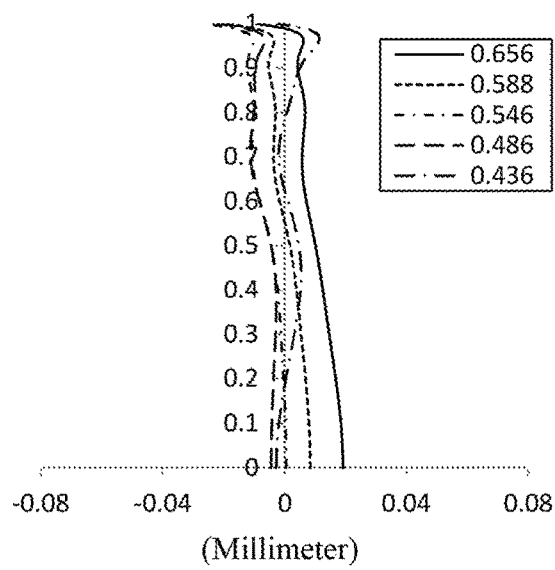
FIGS. 8A to 8D illustrate a longitudinal aberration curve, an astigmatic curve, a distortion curve and a lateral color curve of the optical imaging lens assembly of the Example 4, respectively.
Figure 8B:
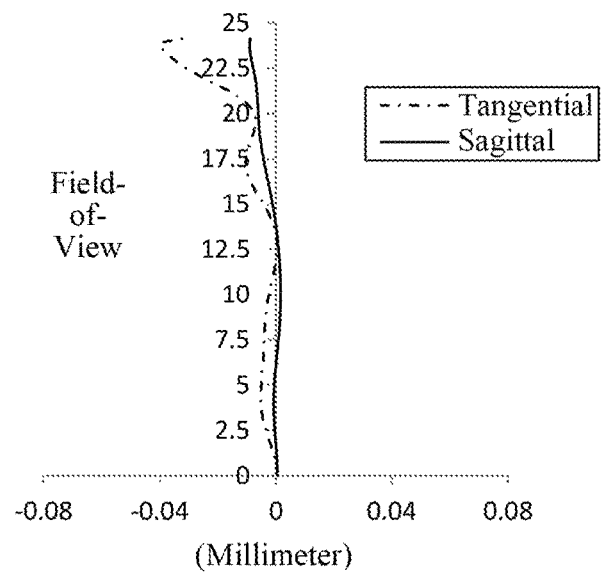
Figure 8C:
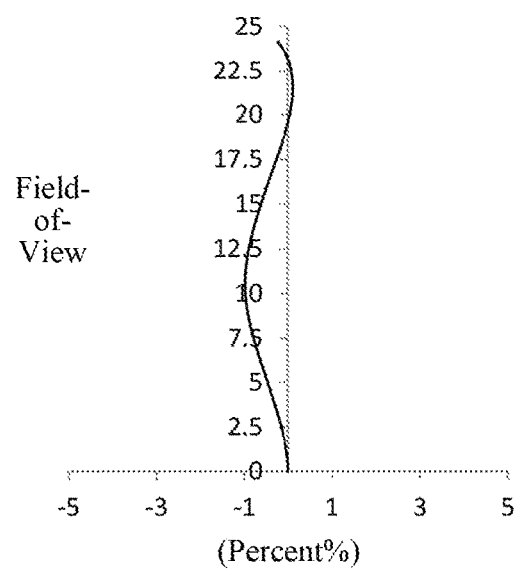
Figure 8D:
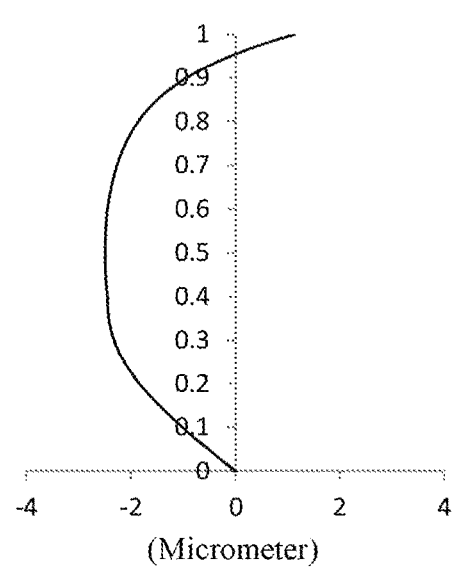

FIG. 8A illustrates a longitudinal aberration curve of the optical imaging lens assembly according to example 4, representing deviations of focal points converged by light of different wavelengths after passing through the optical imaging lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion at different FOVs. FIG. 8D illustrates a lateral color curve of the optical imaging lens assembly according to example 4, representing deviations of different image heights on an imaging plane after light passes through the optical imaging lens assembly. It can be seen from FIG. 8A to FIG. 8D that the optical imaging lens assembly provided in example 4 may achieve good image quality.

Example 5

Figure 9:
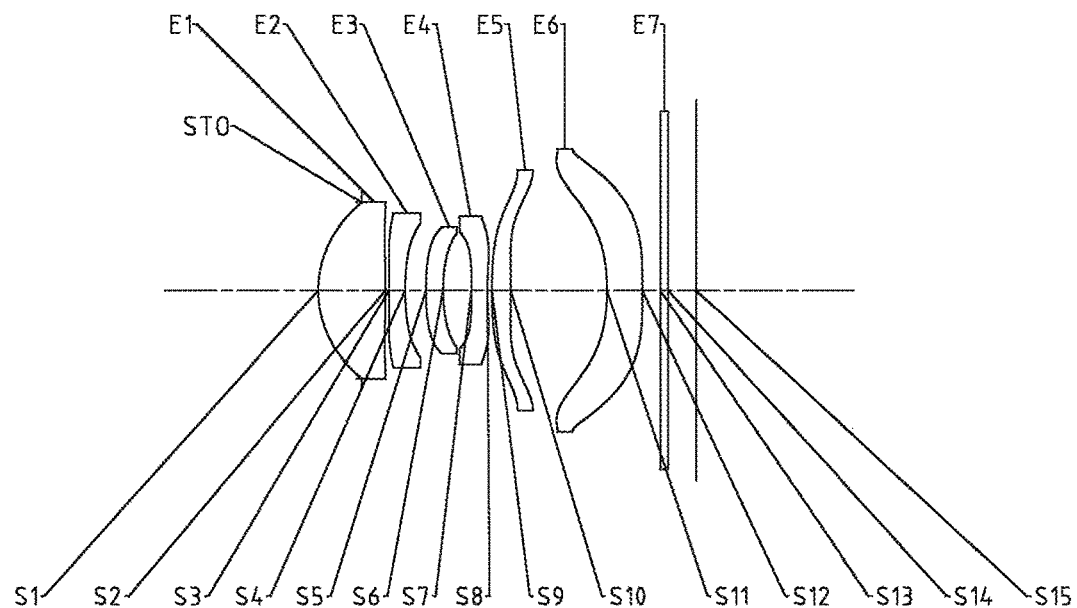
FIG. 9 illustrates a schematic structural view of an optical imaging lens assembly according to Example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15.

Table 13 shows surface type, radius of curvature, thickness, material and conic coefficient of each lens of the optical imaging lens assembly in example 5, wherein the units for the radius of curvature and the thickness are millimeter (mm).

TABLE 13

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.6161 | | | |
| S1 | aspheric | 1.5575 | 0.9600 | 1.55 | 56.1 | −0.0799 |
| S2 | aspheric | −14.3210 | 0.0500 | | | −99.0000 |
| S3 | aspheric | −931.3190 | 0.2300 | 1.67 | 20.4 | −99.0000 |
| S4 | aspheric | 3.4580 | 0.2969 | | | 0.4074 |
| S5 | aspheric | 4.1893 | 0.2455 | 1.55 | 56.1 | 8.2825 |
| S6 | aspheric | 2.4689 | 0.4053 | | | −1.2285 |
| S7 | aspheric | 68.4332 | 0.2300 | 1.55 | 56.1 | −99.0000 |
| S8 | aspheric | 3.9444 | 0.0640 | | | −36.3679 |
| S9 | aspheric | 6.3003 | 0.2699 | 1.65 | 23.5 | 9.4764 |
| S10 | aspheric | −31.3370 | 1.3822 | | | −99.0000 |
| S11 | aspheric | −3.5460 | 0.5062 | 1.55 | 56.1 | −44.5577 |
| S12 | aspheric | 1000.0000 | 0.2575 | | | 99.0000 |
| S13 | spherical | infinite | 0.1100 | 1.52 | 64.2 | |
| S14 | spherical | infinite | 0.4025 | | | |
| S15 | spherical | infinite | | | | |

As can be seen from Table 13, in example 5, the object-side surface and the image-side surface of any one of the first lens E1 to the sixth lens E6 are aspheric. Table 14 shows high-order coefficients applicable to each aspheric surface in example 5, wherein the surface shape of each aspheric surface may be defined by the formula (1) given in the above example 1.

TABLE 14

| Surface number | A4 | A6 | A8 | A10 | A12 | A14 | A16 |
|---|---|---|---|---|---|---|---|
| S1 | 2.7300E−04 | −9.8000E−05 | −1.5100E−03 | 1.8530E−03 | −1.0200E−03 | 0.0000E+00 | 0.0000E+00 |
| S2 | −4.1570E−02 | 1.9228E−01 | −2.1347E−01 | 1.0707E−01 | −2.0850E−02 | 0.0000E+00 | 0.0000E+00 |
| S3 | −8.4970E−02 | 3.4526E−01 | −3.7248E−01 | 1.9056E−01 | −3.9210E−02 | 0.0000E+00 | 0.0000E+00 |
| S4 | −4.0640E−02 | 2.8362E−01 | −2.4068E−01 | 1.7210E−01 | −8.3820E−02 | 0.0000E+00 | 0.0000E+00 |
| S5 | 2.5071E−02 | 1.6503E−01 | 1.2716E−02 | −4.5920E−02 | 3.3585E−02 | 0.0000E+00 | 0.0000E+00 |
| S6 | 3.8966E−02 | 5.2233E−02 | 2.5646E−01 | −3.9616E−01 | 3.4247E−01 | 0.0000E+00 | 0.0000E+00 |
| S7 | −2.6947E−01 | −1.3609E−01 | 9.2811E−02 | 1.1214E−01 | −2.2482E−01 | 0.0000E+00 | 0.0000E+00 |
| S8 | −1.2062E−01 | −2.4502E−01 | 4.2099E−01 | −3.1734E−01 | 1.0528E−01 | 0.0000E+00 | 0.0000E+00 |
| S9 | −6.6000E−03 | 8.9727E−02 | −6.0740E−02 | 1.5020E−02 | −1.4500E−03 | 0.0000E+00 | 0.0000E+00 |
| S10 | −1.1350E−02 | 1.7049E−02 | −1.1254E−02 | 2.8983E−03 | −2.8400E−03 | 0.0000E+00 | 0.0000E+00 |
| S11 | −2.4575E−01 | 1.9915E−01 | −1.2906E−01 | 5.2125E−02 | −1.1070E−02 | 1.1210E−03 | −4.0371E−05 |
| S12 | −1.7316E−01 | 9.2369E−02 | −3.7050E−02 | 5.4540E−03 | 1.3520E−03 | −6.3000E−04 | 6.8432E−05 |

Table 15 shows effective focal lengths f1 to f6 of respective lens, a total effective focal length f of the optical imaging lens assembly, a distance TTL along the optical axis from a center of the object-side surface S1 of the first lens E1 to the imaging plane S15 and half of a maximal field-of-view HFOV of the optical imaging lens assembly in example 5.

TABLE 15

| f1 (mm) | 2.63 | f6 (mm) | −6.46 |
| f2 (mm) | −5.16 | f (mm) | 6.08 |
| f3 (mm) | −11.59 | TTL (mm) | 5.41 |
| f4 (mm) | −7.67 | HFOV (°) | 24.1 |
| f5 (mm) | 8.16 | | |

Figure 10A:
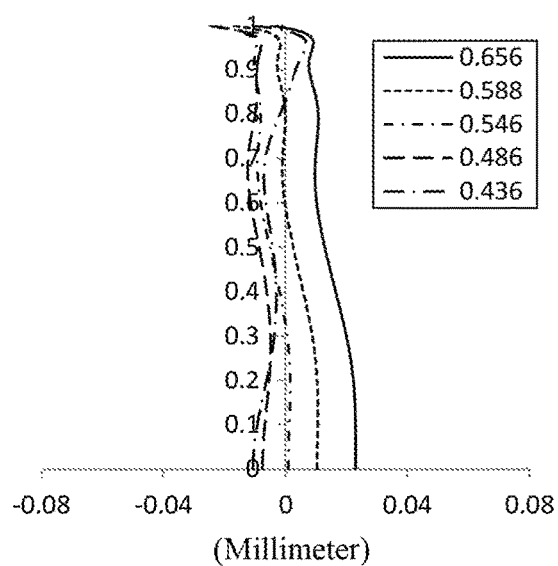
Figure 10B:
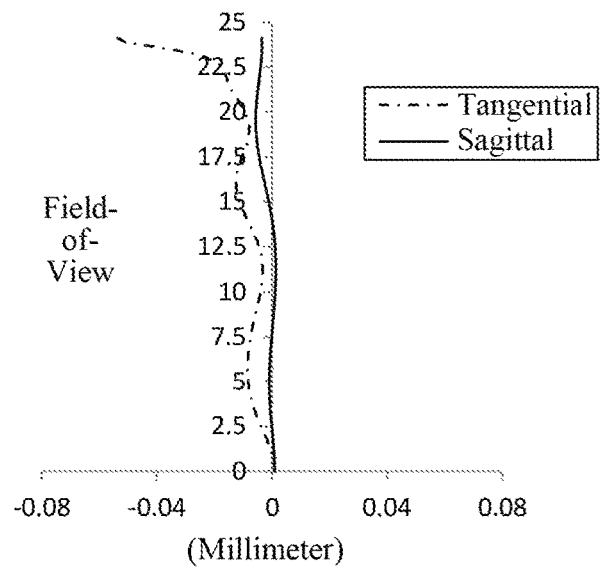

FIG. 10A illustrates a longitudinal aberration curve of the optical imaging lens assembly according to example 5, representing deviations of focal points converged by light of different wavelengths after passing through the optical imaging lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion at different FOVs. FIG. 10D illustrates a lateral color curve of the optical imaging lens assembly according to example 5, representing deviations of different image heights on an imaging plane after light passes through the optical imaging lens assembly. It can be seen from FIG. 10A to FIG. 10D that the optical imaging lens assembly provided in example 5 may achieve good image quality.

Example 6

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a concave surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15.

Table 16 shows surface type, radius of curvature, thickness, material and conic coefficient of each lens of the optical imaging lens assembly in example 6, wherein the units for the radius of curvature and the thickness are millimeter (mm).

TABLE 16

| | | | | Material | | |
| Surface number | Surface type | Radius of curvature | Thickness | Refractive index | Abbe number | Conic coefficient |
| --- | --- | --- | --- | --- | --- | --- |
| OBJ | spherical | infinite | infinite | | | |
| STO | spherical | infinite | −0.6101 | | | |
| S1 | aspheric | 1.5534 | 0.9600 | 1.55 | 56.1 | −0.0856 |
| S2 | aspheric | −16.8210 | 0.0500 | | | −33.5253 |
| S3 | aspheric | 34.7770 | 0.2300 | 1.67 | 20.4 | 99.0000 |
| S4 | aspheric | 3.2132 | 0.4054 | | | −0.1786 |
| S5 | aspheric | −500.0000 | 0.2262 | 1.55 | 56.1 | −99.0000 |
| S6 | aspheric | 6.2613 | 0.3454 | | | −2.6527 |
| S7 | aspheric | 43.4958 | 0.2300 | 1.55 | 56.1 | −99.0000 |
| S8 | aspheric | 4.0924 | 0.0636 | | | −22.9693 |
| S9 | aspheric | 5.6757 | 0.2956 | 1.65 | 23.5 | 6.2894 |
| S10 | aspheric | −269.2240 | 1.4157 | | | −99.0000 |
| S11 | aspheric | −3.4343 | 0.4182 | 1.55 | 56.1 | −46.4494 |
| S12 | aspheric | 1000.0000 | 0.2604 | | | −99.0000 |
| S13 | spherical | infinite | 0.1100 | 1.52 | 64.2 | |
| S14 | spherical | infinite | 0.3996 | | | |
| S15 | spherical | infinite | | | | |

As can be seen from Table 16, in example 6, the object-side surface and the image-side surface of any one of the first lens E1 to the sixth lens E6 are aspheric. Table 17 shows high-order coefficients applicable to each aspheric surface in example 6, wherein the surface shape of each aspheric surface may be defined by the formula (1) given in the above example 1.

TABLE 17

| Surface number | A4 | A6 | A8 | A10 | A12 | A14 | A16 |
|---|---|---|---|---|---|---|---|
| S1 | −1.6800E−03 | 3.4950E−03 | −7.1200E−03 | 5.5700E−03 | −2.0600E−03 | 0.0000E+00 | 0.0000E+00 |
| S2 | −3.1730E−02 | 1.3938E−01 | −1.3895E−01 | 6.0056E−02 | −9.7900E−03 | 0.0000E+00 | 0.0000E+00 |
| S3 | −6.2310E−02 | 2.2901E−01 | −1.9422E−01 | 7.0602E−02 | −8.8200E−03 | 0.0000E+00 | 0.0000E+00 |
| S4 | −2.2450E−02 | 1.8536E−01 | −1.3747E−01 | 1.6886E−01 | −9.8560E−02 | 0.0000E+00 | 0.0000E+00 |
| S5 | 5.5145E−02 | 9.1202E−02 | 1.2963E−01 | −1.1003E−01 | 4.7092E−02 | 0.0000E+00 | 0.0000E+00 |
| S6 | 4.7672E−02 | −4.4920E−02 | 4.3584E−01 | −5.7229E−01 | 3.8165E−01 | 0.0000E+00 | 0.0000E+00 |
| S7 | −2.0973E−01 | −2.4979E−01 | 2.2628E−01 | 5.1911E−02 | −1.8305E−01 | 0.0000E+00 | 0.0000E+00 |
| S8 | −8.6370E−02 | −2.7208E−01 | 4.3856E−01 | −2.9435E−01 | 8.0232E−02 | 0.0000E+00 | 0.0000E+00 |
| S9 | −2.6930E−02 | 1.0515E−01 | −7.1940E−02 | 2.0759E−02 | −2.5300E−03 | 0.0000E+00 | 0.0000E+00 |
| S10 | −3.2740E−02 | 1.5455E−01 | −9.3030E−02 | 2.3218E−02 | −2.3600E−03 | 0.0000E+00 | 0.0000E+00 |
| S11 | −2.5440E−01 | 1.9107E−01 | −9.6740E−02 | 2.9103E−02 | −4.1800E−03 | 1.8600E−04 | 6.4266E−06 |
| S12 | −1.7988E−01 | 9.7008E−02 | −3.8730E−02 | 8.7680E−03 | −7.2000E−04 | −1.2000E−04 | 2.5017E−05 |

Table 18 shows effective focal lengths f1 to f6 of respective lens, a total effective focal length f of the optical imaging lens assembly, a distance TTL along the optical axis from a center of the object-side surface S1 of the first lens E1 to the imaging plane S15 and half of a maximal field-of-view HFOV of the optical imaging lens assembly in example 6.

TABLE 18

| f1 (mm) | 2.65 | f6 (mm) | −6.26 |
|---|---|---|---|
| f2 (mm) | −5.32 | f (mm) | 6.08 |
| f3 (mm) | −11.31 | TTL (mm) | 5.41 |
| f4 (mm) | −8.28 | HFOV (°) | 24.1 |
| f5 (mm) | 8.62 | | |

Figure 12A:
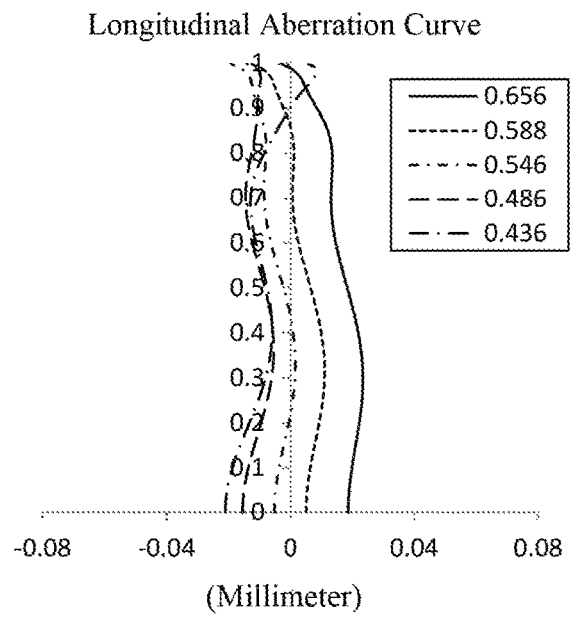
FIGS. 12A to 12D illustrate a longitudinal aberration curve, an astigmatic curve, a distortion curve and a lateral color curve of the optical imaging lens assembly of the Example 6, respectively.
Figure 12B:
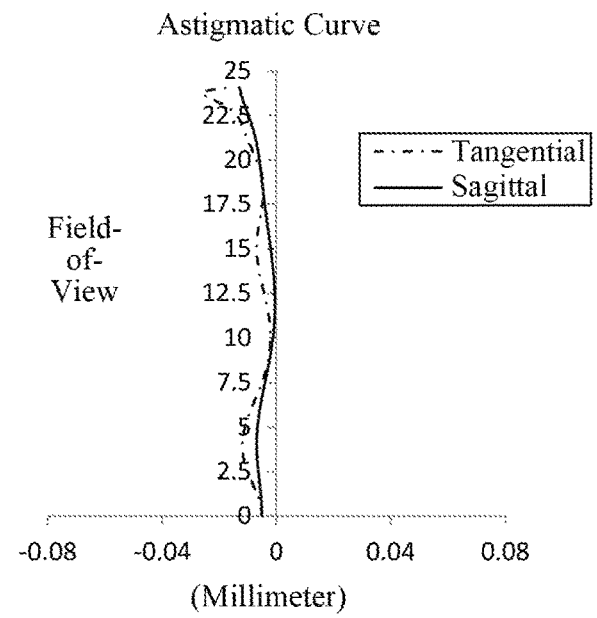
Figure 12C:
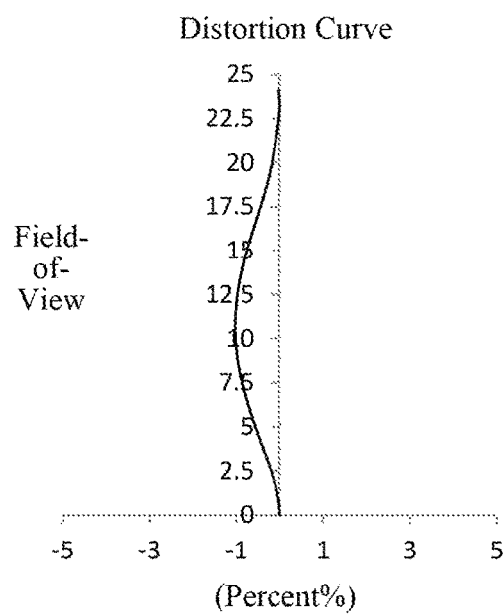
Figure 12D:
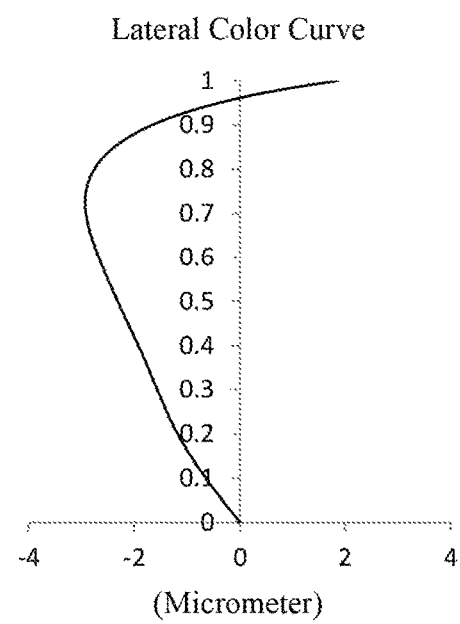

FIG. 12A illustrates a longitudinal aberration curve of the optical imaging lens assembly according to example 6, representing deviations of focal points converged by light of different wavelengths after passing through the optical imaging lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion at different FOVs. FIG. 12D illustrates a lateral color curve of the optical imaging lens assembly according to example 6, representing deviations of different image heights on an imaging plane after light passes through the optical imaging lens assembly. It can be seen from FIG. 12A to FIG. 12D that the optical imaging lens assembly provided in example 6 may achieve good image quality.

Example 7

Figure 13:
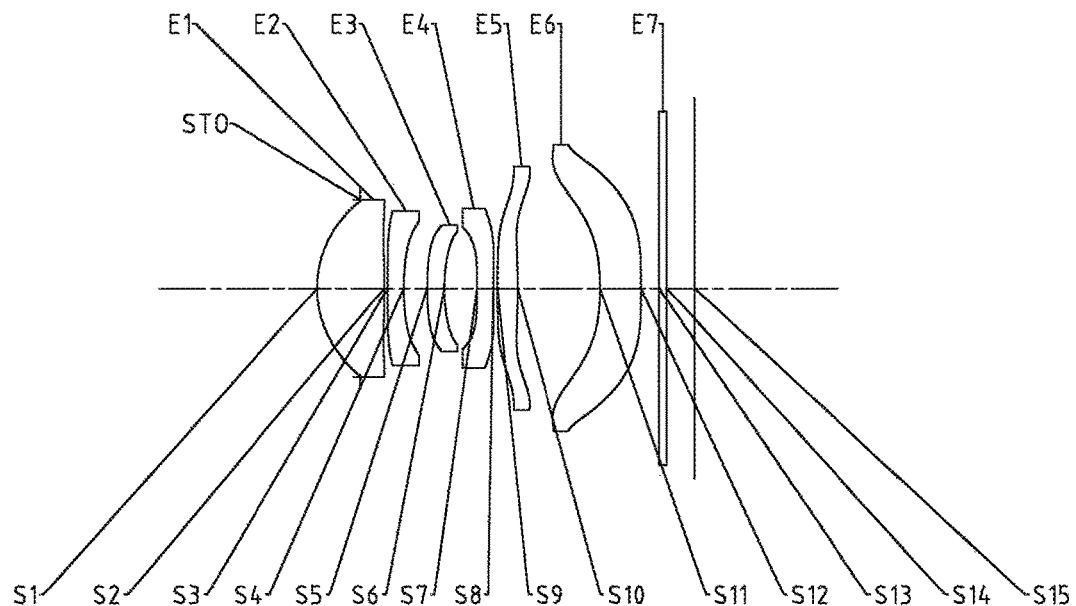
FIG. 13 illustrates a schematic structural view of an optical imaging lens assembly according to Example 7 of the present disclosure.

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15.

Table 19 shows surface type, radius of curvature, thickness, material and conic coefficient of each lens of the optical imaging lens assembly in example 7, wherein the units for the radius of curvature and the thickness are millimeter (mm).

TABLE 19

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.6174 | | | |
| S1 | aspheric | 1.5488 | 0.9600 | 1.55 | 56.1 | −0.0814 |
| S2 | aspheric | −22.0271 | 0.0500 | | | 55.7334 |
| S3 | aspheric | 40.1078 | 0.2300 | 1.67 | 20.4 | 99.0000 |
| S4 | aspheric | 3.4771 | 0.3343 | | | 1.0353 |
| S5 | aspheric | 4.4540 | 0.2439 | 1.55 | 56.1 | 9.0395 |
| S6 | aspheric | 2.6282 | 0.4720 | | | −1.6116 |
| S7 | aspheric | −12.9056 | 0.2300 | 1.55 | 56.1 | −99.0000 |
| S8 | aspheric | 29.2544 | 0.0627 | | | 99.0000 |
| S9 | aspheric | −1000.0000 | 0.2864 | 1.65 | 23.5 | −99.0000 |
| S10 | aspheric | −20.0000 | 1.1876 | | | −99.0000 |
| S11 | aspheric | −3.8902 | 0.5830 | 1.55 | 56.1 | −58.2276 |
| S12 | aspheric | 500.0000 | 0.2605 | | | −99.0000 |
| S13 | spherical | infinite | 0.1100 | 1.52 | 64.2 | |
| S14 | spherical | infinite | 0.3995 | | | |
| S15 | spherical | infinite | | | | |

As can be seen from Table 19, in example 7, the object-side surface and the image-side surface of any one of the first lens E1 to the sixth lens E6 are aspheric. Table 20 shows high-order coefficients applicable to each aspheric surface in example 7, wherein the surface shape of each aspheric surface may be defined by the formula (1) given in the above example 1.

TABLE 20

| Surface number | A4 | A6 | A8 | A10 | A12 | A14 | A16 |
|---|---|---|---|---|---|---|---|
| S1 | −6.6000E−04 | −4.0000E−04 | −3.7000E−04 | 1.1020E−03 | −9.4000E−04 | 0.0000E+00 | 0.0000E+00 |
| S2 | −4.9160E−02 | 1.9938E−01 | −2.2582E−01 | 1.1750E−01 | −2.3710E−02 | 0.0000E+00 | 0.0000E+00 |
| S3 | −7.3360E−02 | 2.9031E−01 | −3.1623E−01 | 1.6871E−01 | −3.6410E−02 | 0.0000E+00 | 0.0000E+00 |
| S4 | −7.7300E−03 | 1.8703E−01 | −1.8446E−01 | 2.1659E−01 | −1.1304E−01 | 0.0000E+00 | 0.0000E+00 |
| S5 | 5.4174E−02 | 1.8803E−02 | 1.8624E−01 | −8.3590E−02 | 2.2956E−02 | 0.0000E+00 | 0.0000E+00 |
| S6 | 7.1153E−02 | −1.2875E−01 | 5.6357E−01 | −6.6874E−01 | 5.2140E−01 | 0.0000E+00 | 0.0000E+00 |
| S7 | −1.0475E−01 | −5.3112E−01 | 3.2833E−01 | 3.1546E−01 | −3.8015E−01 | 0.0000E+00 | 0.0000E+00 |
| S8 | 1.5322E−01 | −7.5787E−01 | 9.2027E−01 | −5.0737E−01 | 1.0735E−01 | 0.0000E+00 | 0.0000E+00 |
| S9 | 6.3653E−02 | 2.9655E−02 | −2.4540E−02 | 2.4710E−03 | 3.4600E−04 | 0.0000E+00 | 0.0000E+00 |
| S10 | −9.7920E−02 | 2.2444E−01 | −1.2430E−01 | 2.8794E−02 | −2.5700E−03 | 0.0000E+00 | 0.0000E+00 |
| S11 | −2.5109E−01 | 1.8670E−01 | −1.1169E−01 | 4.4883E−02 | −9.7600E−03 | 1.0230E−03 | −3.8639E−05 |
| S12 | −1.7360E−01 | 8.7620E−02 | −3.5710E−02 | 7.3740E−03 | 6.8800E−05 | −3.3000E−04 | 4.2791E−05 |

Table 21 shows effective focal lengths f1 to f6 of respective lens, a total effective focal length f of the optical imaging lens assembly, a distance TTL along the optical axis from a center of the object-side surface S1 of the first lens E1 to the imaging plane S15 and half of a maximal field-of-view HFOV of the optical imaging lens assembly in example 7.

TABLE 21

| f1 (mm) | 2.69 | f6 (mm) | −7.06 |
|---|---|---|---|
| f2 (mm) | −5.72 | f (mm) | 6.07 |
| f3 (mm) | −12.31 | TTL (mm) | 5.41 |
| f4 (mm) | −16.35 | HFOV (°) | 24.2 |
| f5 (mm) | 31.64 | | |

Figure 14A:
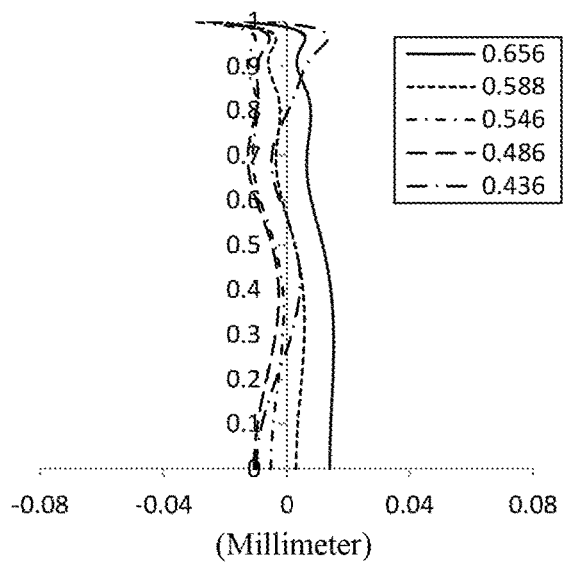
FIGS. 14A to 14D illustrate a longitudinal aberration curve, an astigmatic curve, a distortion curve and a lateral color curve of the optical imaging lens assembly of the Example 7, respectively.
Figure 14B:
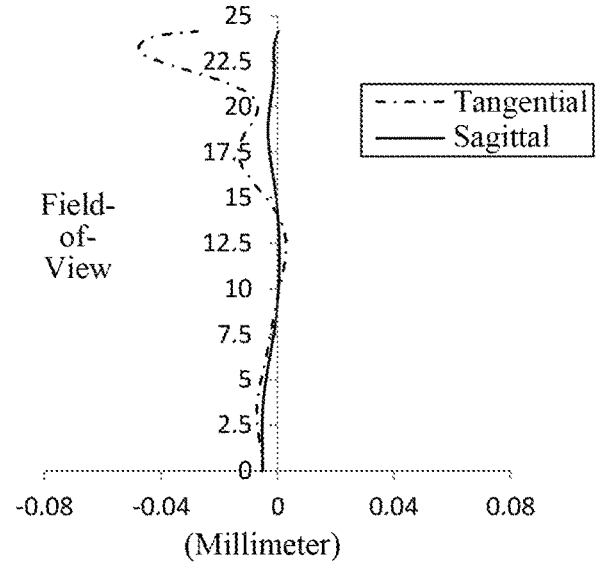
Figures 14C, 14D:
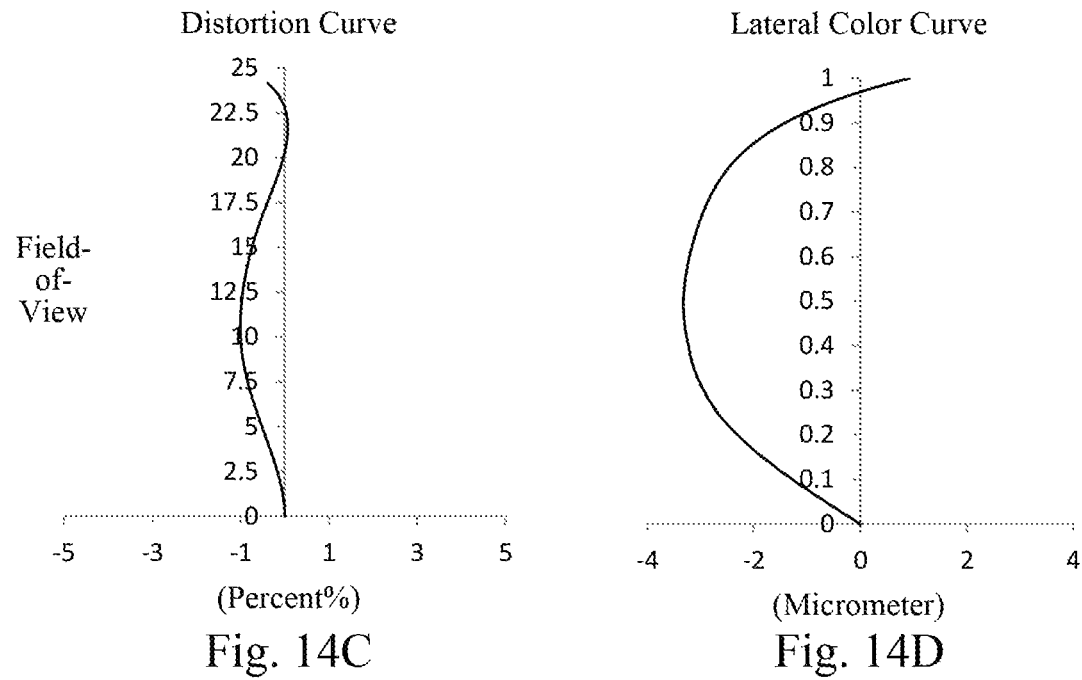

FIG. 14A illustrates a longitudinal aberration curve of the optical imaging lens assembly according to example 7, representing deviations of focal points converged by light of different wavelengths after passing through the optical imaging lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion at different FOVs. FIG. 14D illustrates a lateral color curve of the optical imaging lens assembly according to example 7, representing deviations of different image heights on an imaging plane after light passes through the optical imaging lens assembly. It can be seen from FIG. 14A to FIG. 14D that the optical imaging lens assembly provided in example 7 may achieve good image quality.

Example 8

Figure 15:
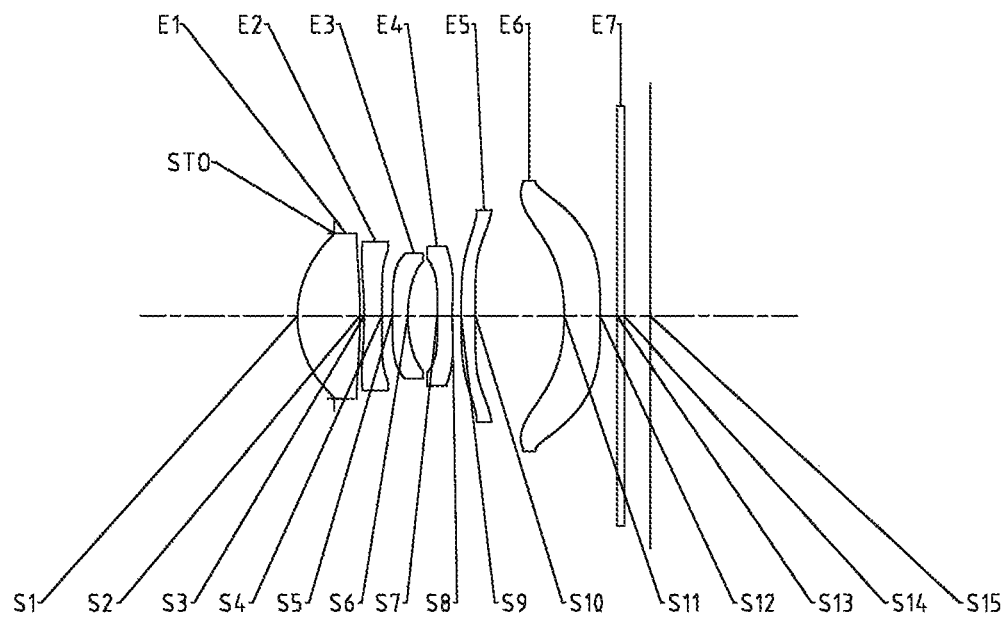
FIG. 15 illustrates a schematic structural view of an optical imaging lens assembly according to Example 8 of the present disclosure.

An optical imaging lens assembly according to example 8 of the present disclosure is described below with reference to FIG. 15 to FIG. 16D. FIG. 15 shows a schematic structural view of the optical imaging lens assembly according to example 8 of the present disclosure.

As shown in FIG. 15, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15.

Table 22 shows surface type, radius of curvature, thickness, material and conic coefficient of each lens of the optical imaging lens assembly in example 8, wherein the units for the radius of curvature and the thickness are millimeter (mm).

TABLE 22

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.5630 | | | |
| S1 | aspheric | 1.6117 | 0.9600 | 1.55 | 56.1 | −0.1018 |
| S2 | aspheric | −8.7770 | 0.0627 | | | −2.2081 |
| S3 | aspheric | −8.1833 | 0.2735 | 1.67 | 20.4 | 33.0541 |
| S4 | aspheric | −200.0000 | 0.1577 | | | −99.0000 |
| S5 | aspheric | 14.1177 | 0.2378 | 1.55 | 56.1 | 99.0000 |
| S6 | aspheric | 2.0597 | 0.4526 | | | −1.8769 |
| S7 | aspheric | 14.7098 | 0.2300 | 1.55 | 56.1 | −86.2724 |
| S8 | aspheric | 5.3646 | 0.1346 | | | −36.3707 |
| S9 | aspheric | 11.6551 | 0.2208 | 1.65 | 23.5 | 31.0978 |
| S10 | aspheric | −63.9632 | 1.3601 | | | −99.0000 |
| S11 | aspheric | −3.4674 | 0.5501 | 1.55 | 56.1 | −49.5213 |
| S12 | aspheric | 500.0000 | 0.2602 | | | 99.0000 |
| S13 | spherical | infinite | 0.1100 | 1.52 | 64.2 | |
| S14 | spherical | infinite | 0.3998 | | | |
| S15 | spherical | infinite | | | | |

As can be seen from Table 22, in example 8, the object-side surface and the image-side surface of any one of the first lens E1 to the sixth lens E6 are aspheric. Table 23 shows high-order coefficients applicable to each aspheric surface in example 8, wherein the surface shape of each aspheric surface may be defined by the formula (1) given in the above example 1.

TABLE 23

| Surface number | A4 | A6 | A8 | A10 | A12 | A14 | A16 |
|---|---|---|---|---|---|---|---|
| S1 | −2.9000E−03 | 3.8820E−03 | −8.4700E−03 | 7.1290E−03 | −2.7600E−03 | 0.0000E+00 | 0.0000E+00 |
| S2 | −4.4110E−02 | 1.4978E−01 | −1.3843E−01 | 5.2814E−02 | −6.5800E−03 | 0.0000E+00 | 0.0000E+00 |
| S3 | −6.6580E−02 | 2.4646E−01 | −2.1101E−01 | 7.8822E−02 | −8.7800E−03 | 0.0000E+00 | 0.0000E+00 |
| S4 | −9.1700E−03 | 1.6279E−01 | −5.7540E−02 | 1.9613E−02 | −2.3410E−02 | 0.0000E+00 | 0.0000E+00 |
| S5 | 5.9172E−02 | 1.2279E−01 | 3.0312E−02 | −7.6800E−03 | −1.3000E−03 | 0.0000E+00 | 0.0000E+00 |
| S6 | 4.3782E−02 | 2.9529E−02 | 2.5409E−01 | −4.1034E−01 | 4.1140E−01 | 0.0000E+00 | 0.0000E+00 |
| S7 | −2.7803E−01 | −2.2810E−02 | −1.9021E−01 | 5.0780E−01 | −3.9446E−01 | 0.0000E+00 | 0.0000E+00 |
| S8 | −1.8946E−01 | −4.8360E−02 | 1.9584E−01 | −1.3920E−01 | 3.6491E−02 | 0.0000E+00 | 0.0000E+00 |
| S9 | −3.1650E−02 | 1.6497E−01 | −1.3188E−01 | 4.2449E−02 | −5.1800E−03 | 0.0000E+00 | 0.0000E+00 |
| S10 | −5.0900E−03 | 1.4391E−01 | −9.9170E−02 | 2.6071E−02 | −2.5700E−03 | 0.0000E+00 | 0.0000E+00 |
| S11 | −2.4153E−01 | 2.1242E−01 | −1.4669E−01 | 6.4479E−02 | −1.5780E−02 | 2.0040E−03 | −1.0395E−04 |
| S12 | −1.6871E−01 | 1.0139E−01 | −5.0070E−02 | 1.3150E−02 | −1.1400E−03 | −1.9000E−04 | 3.5425E−05 |

Table 24 shows effective focal lengths f1 to f6 of respective lens, a total effective focal length f of the optical imaging lens assembly, a distance TTL along the optical axis from a center of the object-side surface S1 of the first lens E1 to the imaging plane S15 and half of a maximal field-of-view HFOV of the optical imaging lens assembly in example 8.

TABLE 24

| | | | |
|---|---|---|---|
| f1 (mm) | 2.58 | f6 (mm) | −6.30 |
| f2 (mm) | −12.79 | f (mm) | 6.07 |
| f3 (mm) | −4.44 | TTL (mm) | 5.41 |
| f4 (mm) | −15.59 | HFOV (°) | 24.1 |
| f5 (mm) | 15.30 | | |

Figure 16A:
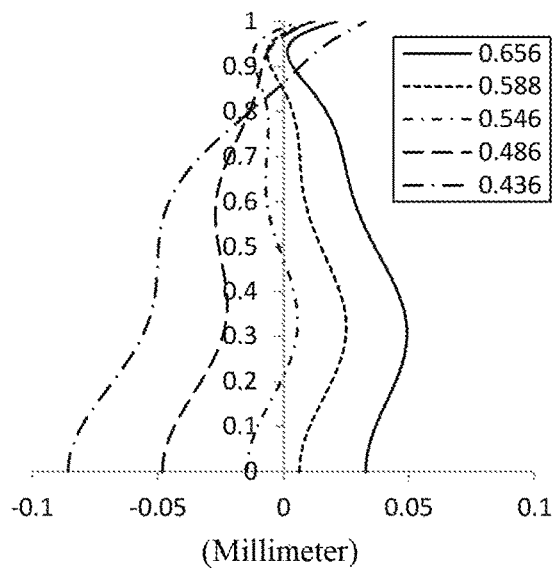
FIGS. 16A to 16D illustrate a longitudinal aberration curve, an astigmatic curve, a distortion curve and a lateral color curve of the optical imaging lens assembly of the Example 8, respectively.
Figure 16B:
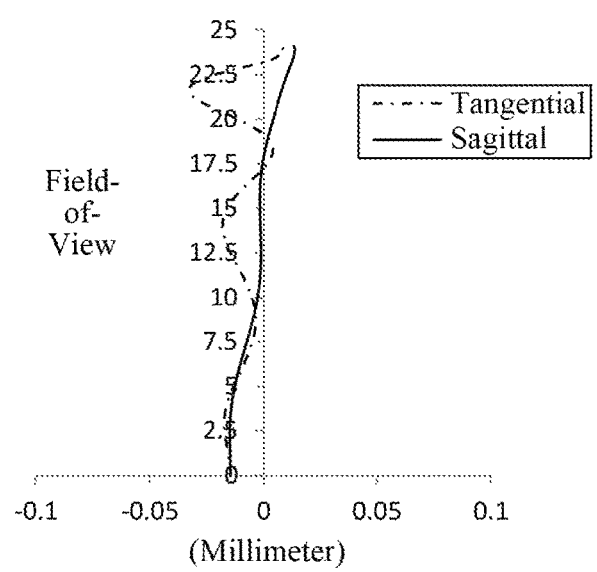
Figure 16C:
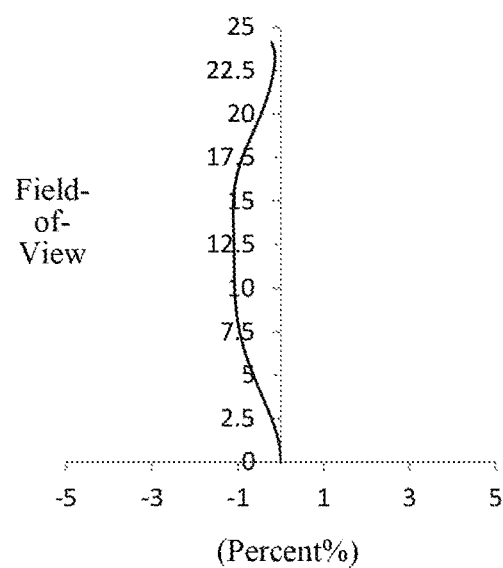
Figure 16D:
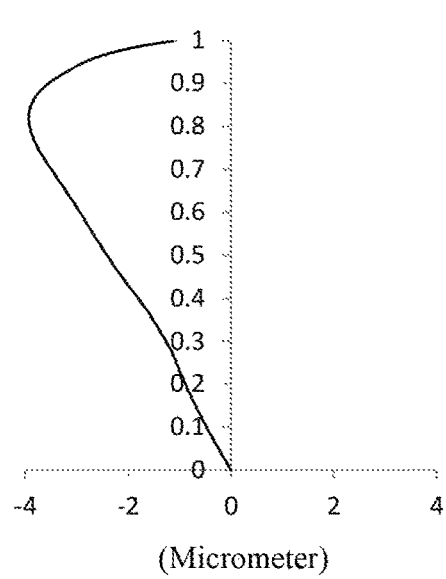

FIG. 16A illustrates a longitudinal aberration curve of the optical imaging lens assembly according to example 8, representing deviations of focal points converged by light of different wavelengths after passing through the optical imaging lens assembly. FIG. 16B illustrates an astigmatic curve of the optical imaging lens assembly according to example 8, representing a curvature of a tangential plane and a curvature of a sagittal plane. FIG. 16C illustrates a distortion curve of the optical imaging lens assembly according to example 8, representing amounts of distortion at different FOVs. FIG. 16D illustrates a lateral color curve of the optical imaging lens assembly according to example 8, representing deviations of different image heights on an imaging plane after light passes through the optical imaging lens assembly. It can be seen from FIG. 16A to FIG. 16D that the optical imaging lens assembly provided in example 8 may achieve good image quality.

Example 9

Figure 17:
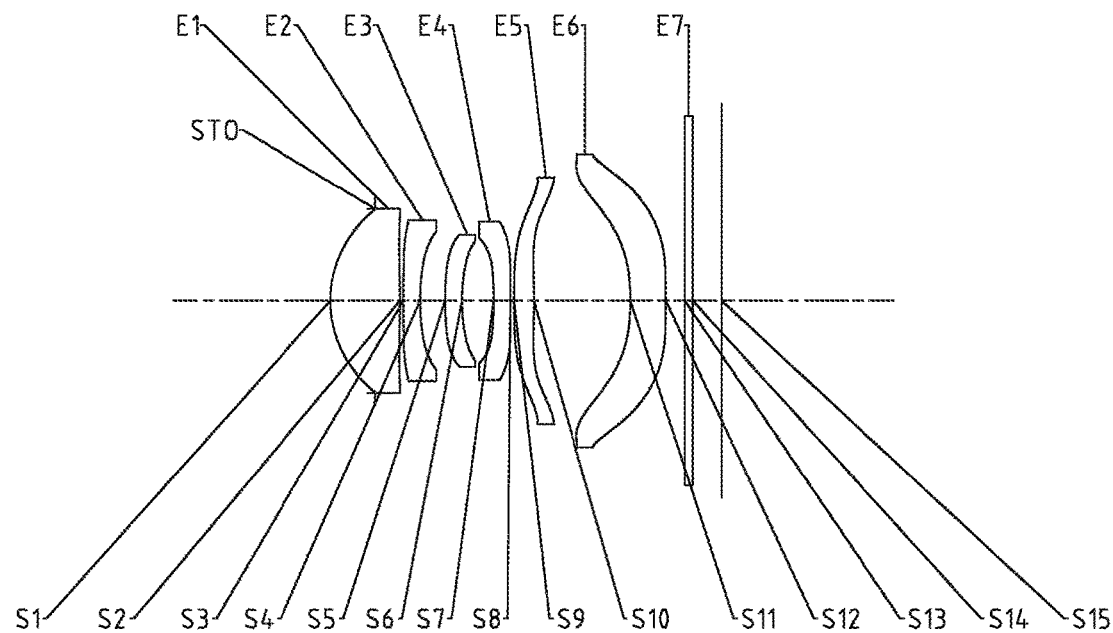
FIG. 17 illustrates a schematic structural view of an optical imaging lens assembly according to Example 9 of the present disclosure.

An optical imaging lens assembly according to example 9 of the present disclosure is described below with reference to FIG. 17 to FIG. 18D. FIG. 17 shows a schematic structural view of the optical imaging lens assembly according to example 9 of the present disclosure.

As shown in FIG. 17, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane 515, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15.

Table 25 shows surface type, radius of curvature, thickness, material and conic coefficient of each lens of the optical imaging lens assembly in example 9, wherein the units for the radius of curvature and the thickness are millimeter (mm).

TABLE 25

| | | | | Material | | |
|---|---|---|---|---|---|---|
| Surface number | Surface type | Radius of curvature | Thickness | Refractive index | Abbe number | Conic coefficient |
| OBJ | spherical | infinite | infinite | | | |
| STO | spherical | infinite | −0.6159 | | | |
| S1 | aspheric | 1.5546 | 0.9600 | 1.55 | 56.1 | −0.0789 |
| S2 | aspheric | −18.1815 | 0.0500 | | | −44.5962 |
| S3 | aspheric | 39.6703 | 0.2300 | 1.67 | 20.4 | 99.0000 |
| S4 | aspheric | 3.2495 | 0.3454 | | | 0.3427 |
| S5 | aspheric | 4.7563 | 0.2342 | 1.55 | 56.1 | 6.8605 |
| S6 | aspheric | 2.7008 | 0.4355 | | | −1.9295 |
| S7 | aspheric | −8.1957 | 0.2300 | 1.55 | 56.1 | 30.3232 |
| S8 | aspheric | −500.0000 | 0.0500 | | | −99.0000 |
| S9 | aspheric | 15.7404 | 0.2743 | 1.65 | 23.5 | 74.9269 |
| S10 | aspheric | −33.9594 | 1.3429 | | | −99.0000 |
| S11 | aspheric | −3.4755 | 0.4878 | 1.55 | 56.1 | −19.4938 |
| S12 | aspheric | 1000.0000 | 0.2605 | | | 99.0000 |
| S13 | spherical | infinite | 0.1100 | 1.52 | 64.2 | |
| S14 | spherical | infinite | 0.3995 | | | |
| S15 | spherical | infinite | | | | |

As can be seen from Table 25, in example 9, the object-side surface and the image-side surface of any one of the first lens E1 to the sixth lens E6 are aspheric. Table 26 shows high-order coefficients applicable to each aspheric surface in example 9, wherein the surface shape of each aspheric surface may be defined by the formula (1) given in the above example 1.

TABLE 26

| Surface number | A4 | A6 | A8 | A10 | A12 | A14 | A16 |
|---|---|---|---|---|---|---|---|
| S1 | −2.6000E−05 | −2.5000E−04 | −9.5000E−04 | 1.2190E−03 | −8.4000E−04 | 0.0000E+00 | 0.0000E+00 |
| S2 | −3.7810E−02 | 1.7027E−01 | −1.8837E−01 | 9.4549E−02 | −1.8490E−02 | 0.0000E+00 | 0.0000E+00 |
| S3 | −7.5440E−02 | 2.9206E−01 | −3.0075E−01 | 1.4931E−01 | −3.0550E−02 | 0.0000E+00 | 0.0000E+00 |
| S4 | −3.0080E−02 | 2.3667E−01 | −2.0426E−01 | 1.9840E−01 | −1.0606E−01 | 0.0000E+00 | 0.0000E+00 |
| S5 | 2.1194E−02 | 1.3444E−01 | 4.5304E−02 | −1.8490E−02 | 5.1880E−03 | 0.0000E+00 | 0.0000E+00 |
| S6 | 4.3616E−02 | 7.3650E−03 | 3.0956E−01 | −4.1171E−01 | 3.3889E−01 | 0.0000E+00 | 0.0000E+00 |
| S7 | −1.1059E−01 | −3.4304E−01 | 2.1292E−01 | 1.2908E−01 | −2.4254E−01 | 0.0000E+00 | 0.0000E+00 |
| S8 | 8.1860E−02 | −5.1165E−01 | 5.8069E−01 | −3.3510E−01 | 8.4556E−02 | 0.0000E+00 | 0.0000E+00 |
| S9 | 7.0254E−02 | −3.2700E−03 | 1.9020E−03 | −5.4700E−03 | 1.1510E−03 | 0.0000E+00 | 0.0000E+00 |
| S10 | −4.4930E−02 | 1.7004E−01 | −9.4190E−02 | 2.0392E−02 | −1.6300E−03 | 0.0000E+00 | 0.0000E+00 |
| S11 | −2.0637E−01 | 1.3025E−01 | −6.3590E−02 | 1.7174E−02 | −6.0000E−04 | −5.2000E−04 | 6.4381E−05 |
| S12 | −1.8753E−01 | 1.0873E−01 | −5.0550E−02 | 1.3022E−02 | −1.0800E−03 | −2.3000E−04 | 4.2285E−05 |

Table 27 shows effective focal lengths f1 to f6 of respective lens, a total effective focal length f of the optical imaging lens assembly, a distance TTL along the optical axis from a center of the object-side surface S1 of the first lens E1 to the imaging plane S15 and half of a maximal field-of-view HFOV of the optical imaging lens assembly in example 9.

TABLE 27

| f1 (mm) | 2.67 | f6 (mm) | −6.34 |
|---|---|---|---|
| f2 (mm) | −5.32 | f (mm) | 6.08 |
| f3 (mm) | −11.92 | TTL (mm) | 5.41 |
| f4 (mm) | −15.25 | HFOV (°) | 24.1 |
| f5 (mm) | 16.71 | | |

Figure 18A:
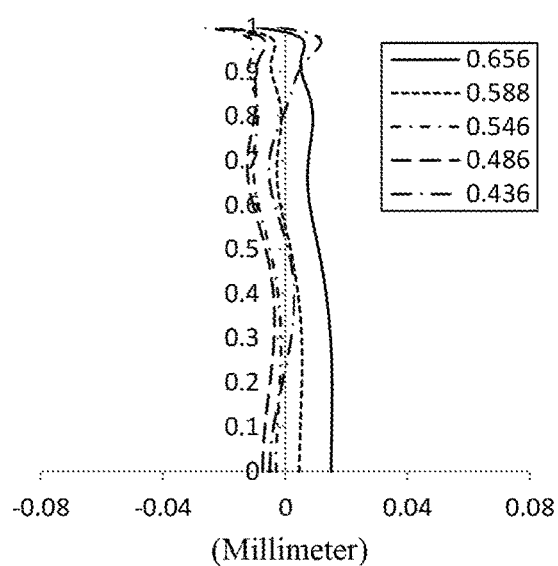
Figure 18B:
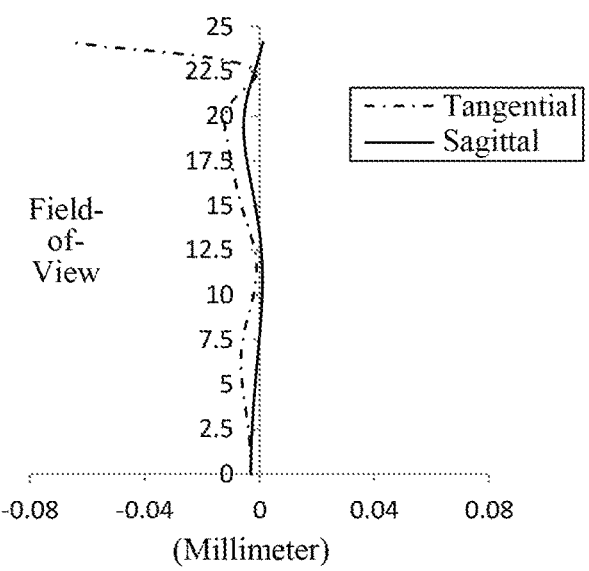

FIG. 18A illustrates a longitudinal aberration curve of the optical imaging lens assembly according to example 9, representing deviations of focal points converged by light of different wavelengths after passing through the optical imaging lens assembly. FIG. 18B illustrates an astigmatic curve of the optical imaging lens assembly according to example 9, representing a curvature of a tangential plane and a curvature of a sagittal plane. FIG. 18C illustrates a distortion curve of the optical imaging lens assembly according to example 9, representing amounts of distortion at different viewing angles. FIG. 18D illustrates a lateral color curve of the optical imaging lens assembly according to example 9, representing deviations of different image heights on an imaging plane after light passes through the optical imaging lens assembly. It can be seen from FIG. 18A to FIG. 18D that the optical imaging lens assembly provided in example 9 may achieve good image quality.

Example 10

An optical imaging lens assembly according to example 10 of the present disclosure is described below with reference to FIG. 19 to FIG. 20D. FIG. 19 shows a schematic structural view of the optical imaging lens assembly according to example 10 of the present disclosure.

As shown in FIG. 19, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15.

Table 28 shows surface type, radius of curvature, thickness, material and conic coefficient of each lens of the optical imaging lens assembly in example 10, wherein the units for the radius of curvature and the thickness are millimeter (mm).

TABLE 28

| | | | | Material | | |
|---|---|---|---|---|---|---|
| Surface number | Surface type | Radius of curvature | Thickness | Refractive index | Abbe number | Conic coefficient |
| OBJ | spherical | infinite | infinite | | | |
| STO | spherical | infinite | −0.6165 | | | |
| S1 | aspheric | 1.5525 | 0.9594 | 1.55 | 56.1 | −0.0831 |
| S2 | aspheric | −21.7569 | 0.0500 | | | 59.8981 |
| S3 | aspheric | 33.9687 | 0.2300 | 1.67 | 20.4 | 99.0000 |
| S4 | aspheric | 3.3250 | 0.3478 | | | 1.7477 |

TABLE 28-continued

| Surface number | Surface type | Radius of curvature | Thickness | Material Refractive index | Abbe number | Conic coefficient |
|---|---|---|---|---|---|---|
| S5 | aspheric | 4.3900 | 0.2312 | 1.55 | 56.1 | 7.5835 |
| S6 | aspheric | 2.6121 | 0.4998 | | | −1.6441 |
| S7 | aspheric | −7.3269 | 0.2000 | 1.55 | 56.1 | −99.0000 |
| S8 | aspheric | −20.1327 | 0.0500 | | | 70.4244 |
| S9 | aspheric | −1000.0000 | 0.2862 | 1.65 | 23.5 | 99.0000 |
| S10 | aspheric | −20.0000 | 1.2317 | | | −13.0900 |
| S11 | aspheric | −3.6878 | 0.5539 | 1.55 | 56.1 | −50.9495 |
| S12 | aspheric | 500.0000 | 0.2605 | | | 99.0000 |
| S13 | spherical | infinite | 0.1100 | 1.52 | 64.2 | |
| S14 | spherical | infinite | 0.3995 | | | |
| S15 | spherical | infinite | | | | |

As can be seen from Table 28, in example 10, the object-side surface and the image-side surface of any one of the first lens E1 to the sixth lens E6 are aspheric. Table 29 shows high-order coefficients applicable to each aspheric surface in example 10, wherein the surface shape of each aspheric surface may be defined by the formula (1) given in the above example 1.

Figure 20A:
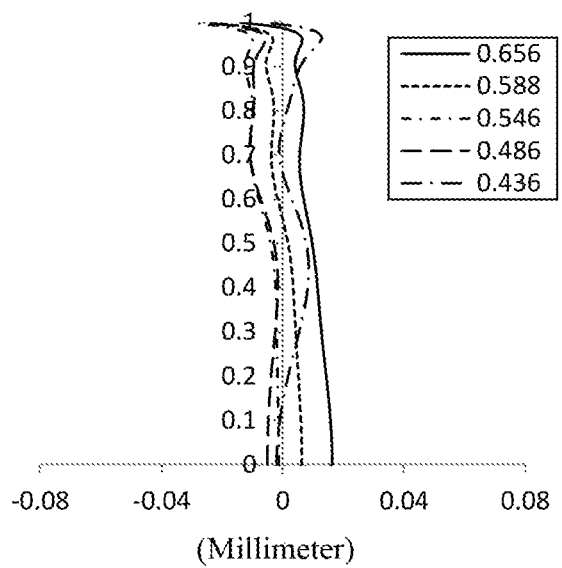
FIGS. 20A to 20D illustrate a longitudinal aberration curve, an astigmatic curve, a distortion curve and a lateral color curve of the optical imaging lens assembly of the Example 10, respectively.
Figure 20B:
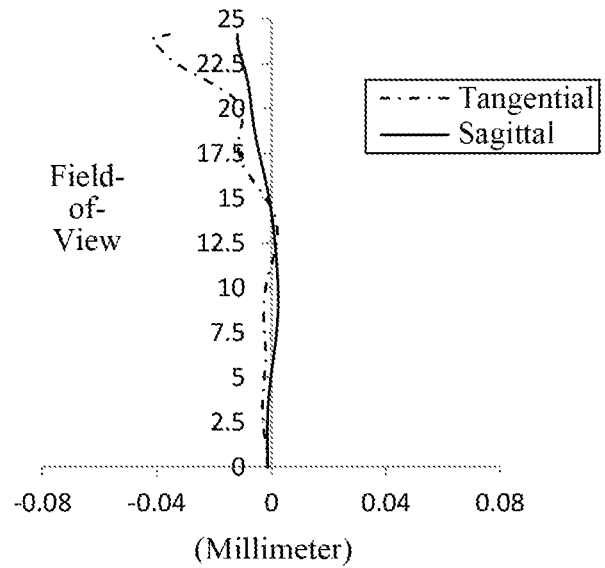

FIG. 20A illustrates a longitudinal aberration curve of the optical imaging lens assembly according to example 10, representing deviations of focal points converged by light of different wavelengths after passing through the optical imaging lens assembly. FIG. 20B illustrates an astigmatic curve of the optical imaging lens assembly according to example

TABLE 29

| Surface number | A4 | A6 | A8 | A10 | A12 | A14 | A16 |
|---|---|---|---|---|---|---|---|
| S1 | −1.6000E−04 | −1.2700E−03 | 5.2300E−04 | 4.3500E−04 | −6.9000E−04 | 0.0000E+00 | 0.0000E+00 |
| S2 | −5.5020E−02 | 2.0808E−01 | −2.2809E−01 | 1.1590E−01 | −2.3020E−02 | 0.0000E+00 | 0.0000E+00 |
| S3 | −7.8080E−02 | 3.0869E−01 | −3.2913E−01 | 1.7115E−01 | −3.6260E−02 | 0.0000E+00 | 0.0000E+00 |
| S4 | −9.6700E−03 | 2.0594E−01 | −2.0104E−01 | 2.1862E−01 | −1.0840E−01 | 0.0000E+00 | 0.0000E+00 |
| S5 | 4.9123E−02 | 3.6572E−02 | 1.4825E−01 | −6.1390E−02 | 1.2892E−02 | 0.0000E+00 | 0.0000E+00 |
| S6 | 6.9186E−02 | −7.7840E−02 | 3.8918E−01 | −4.1047E−01 | 3.2250E−01 | 0.0000E+00 | 0.0000E+00 |
| S7 | −7.4020E−02 | −5.6642E−01 | 4.3379E−01 | 1.3530E−01 | −2.7838E−01 | 0.0000E+00 | 0.0000E+00 |
| S8 | 2.0713E−01 | −8.2200E−01 | 9.6443E−01 | −5.4145E−01 | 1.2108E−01 | 0.0000E+00 | 0.0000E+00 |
| S9 | 7.1455E−02 | 2.1471E−02 | −2.0960E−02 | 2.6890E−03 | 1.1800E−04 | 0.0000E+00 | 0.0000E+00 |
| S10 | −9.4260E−02 | 2.2293E−01 | −1.2239E−01 | 2.8113E−02 | −2.4900E−03 | 0.0000E+00 | 0.0000E+00 |
| S11 | −2.5066E−01 | 1.7956E−01 | −9.4630E−02 | 3.1771E−02 | −5.2400E−03 | 2.8500E−04 | 7.9811E−06 |
| S12 | −1.6966E−01 | 7.6178E−02 | −2.1600E−02 | −1.6000E−04 | 2.1200E−03 | −6.0000E−04 | 5.7053E−05 |

Table 30 shows effective focal lengths f1 to f6 of respective lens, a total effective focal length f of the optical imaging lens assembly, a distance TTL along the optical axis from a center of the object-side surface S1 of the first lens E1 to the imaging plane S15 and half of a maximal field-of-view HFOV of the optical imaging lens assembly in example 10.

TABLE 30

| f1 (mm) | 2.69 | f6 (mm) | −6.70 |
|---|---|---|---|
| f2 (mm) | −5.54 | f (mm) | 6.08 |
| f3 (mm) | −12.37 | TTL (mm) | 5.41 |
| f4 (mm) | −21.19 | HFOV (°) | 24.1 |
| f5 (mm) | 31.64 | | |

Figure 20C:
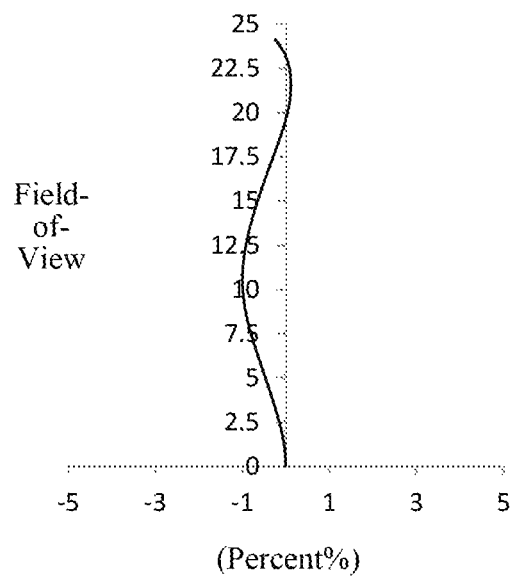
Figure 20D:
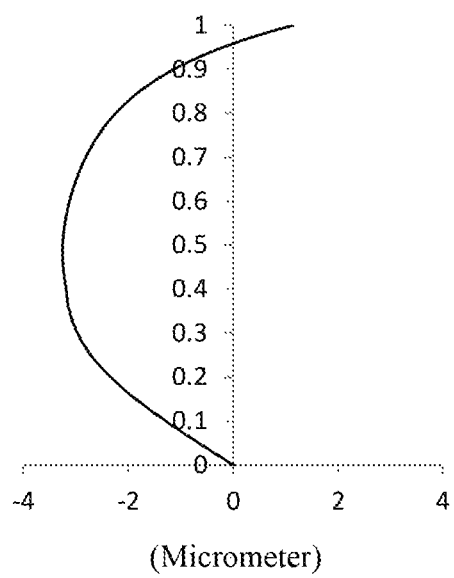

10, representing a curvature of a tangential plane and a curvature of a sagittal plane. FIG. 20C illustrates a distortion curve of the optical imaging lens assembly according to example 10, representing amounts of distortion at different FOVs. FIG. 20D illustrates a lateral color curve of the optical imaging lens assembly according to example 10, representing deviations of different image heights on an imaging plane after light passes through the optical imaging lens assembly. It can be seen from FIG. 20A to FIG. 20D that the optical imaging lens assembly provided in example 10 may achieve good image quality.

In view of the above, examples 1 to 10 respectively satisfy the relationship shown in Table 31.

TABLE 31

| Condition\Example | 1 | 2 | 3 | 4 | 5 | 6 | 7 | 8 | 9 | 10 |
|---|---|---|---|---|---|---|---|---|---|---|
| HFOV (°) | 24.1 | 24.1 | 24.2 | 24.2 | 24.1 | 24.1 | 24.2 | 24.1 | 24.1 | 24.1 |
| f1/CT4 | 11.57 | 11.60 | 11.64 | 11.53 | 11.42 | 11.53 | 11.68 | 11.20 | 11.59 | 13.45 |
| f/f2 | −1.18 | −1.00 | −1.03 | −1.14 | −1.18 | −1.14 | −1.06 | −0.47 | −1.14 | −1.10 |
| f3/f | −2.02 | −0.88 | −1.71 | −2.11 | −1.90 | −1.86 | −2.03 | −0.73 | −1.96 | −2.04 |
| f/f1 | 2.29 | 2.28 | 2.27 | 2.29 | 2.32 | 2.29 | 2.26 | 2.35 | 2.28 | 2.26 |
| (R2 − R1)/(R2 + R1) | 1.19 | 1.20 | 1.17 | 1.17 | 1.24 | 1.20 | 1.15 | 1.45 | 1.19 | 1.15 |
| R6/f | 0.42 | 0.31 | 0.42 | 0.44 | 0.41 | 1.03 | 0.43 | 0.34 | 0.44 | 0.43 |

TABLE 31-continued

| Condition\Example | 1 | 2 | 3 | 4 | 5 | 6 | 7 | 8 | 9 | 10 |
|---|---|---|---|---|---|---|---|---|---|---|
| CT1/CT3 | 4.01 | 4.52 | 3.96 | 4.24 | 3.91 | 4.24 | 3.94 | 4.04 | 4.10 | 4.15 |
| T56/CT6 | 2.61 | 3.30 | 2.02 | 2.23 | 2.73 | 3.39 | 2.04 | 2.47 | 2.75 | 2.22 |
| f6/f | −1.09 | −1.06 | −1.26 | −1.13 | −1.06 | −1.03 | −1.16 | −1.04 | −1.04 | −1.10 |
| T34/TTL*10 | 0.74 | 0.66 | 0.85 | 0.85 | 0.75 | 0.64 | 0.87 | 0.84 | 0.81 | 0.92 |
| T23/CT2 | 1.48 | 1.27 | 1.39 | 1.56 | 1.29 | 1.76 | 1.45 | 0.58 | 1.50 | 1.51 |
| (R10 − R11)/(R10 + R11) | 0.82 | 1.00 | 0.65 | 0.68 | 0.80 | 0.97 | 0.67 | 0.90 | 0.81 | 0.69 |

The present disclosure further provides an imaging apparatus, having a photosensitive element which may be a photosensitive Charge-Coupled Device (CCD) or a Complementary Metal-Oxide Semiconductor (CMOS). The imaging apparatus may be an independent imaging device such as a digital camera, or may be a imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising: a first lens, a second lens, a third lens, a fourth lens, a fifth lens, and a sixth lens, which are sequentially arranged from an object side to an image side of the optical imaging lens assembly along an optical axis,
wherein,
the first lens has a positive refractive power, both of an object-side surface and an image-side surface of the first lens are convex surfaces;
the second lens has a negative refractive power;
the third lens has a negative refractive power, and an image-side surface of the third lens is a concave surface;
the fourth lens has a refractive power;
the fifth lens has a refractive power, and an image-side surface of the fifth lens is a convex surface;
the sixth lens has a refractive power, and an object-side surface of the sixth lens is a concave surface;
wherein HFOV<30°, where HFOV is half of a maximal field-of-view of the optical imaging lens assembly,
f1/CT4>11, where f1 is an effective focal length of the first lens and CT4 is a center thickness of the fourth lens along the optical axis; and $2 < T56/CT6 < 3.5,$ where T56 is a spaced interval between the fifth lens and the sixth lens along the optical axis and CT6 is a center thickness of the sixth lens along the optical axis.

2. The optical imaging lens assembly according to claim 1, wherein 11<f1/CT4<15,
where f1 is the effective focal length of the first lens and CT4 is the center thickness of the fourth lens along the optical axis.

3. The optical imaging lens assembly according to claim 1, wherein 1<(R2−R1)/(R2+R1)<1.5,
where R2 is a radius of curvature of the image-side surface of the first lens and R1 is a radius of curvature of the object-side surface of the first lens.

4. The optical imaging lens assembly according to claim 3, wherein 2<f/f1<2.5,
where f is a total effective focal length of the optical imaging lens assembly and f1 is an effective focal length of the first lens.

5. The optical imaging lens assembly according to claim 1, wherein 0.2<R6/f<1.2,
where R6 is a radius of curvature of the image-side surface of the third lens and f is a total effective focal length of the optical imaging lens assembly.

6. The optical imaging lens assembly according to claim 1, wherein 0.5<(R10−R11)/(R10+R11)<1.5,
where R10 is a radius of curvature of the image-side surface of the fifth lens and R11 is a radius of curvature of the object-side surface of the sixth lens.

7. The optical imaging lens assembly according to claim 6, wherein the sixth lens has a negative refractive power, and wherein −1.6<f6/f<−0.6,
where f6 is an effective focal length of the sixth lens and f is a total effective focal length of the optical imaging lens assembly.

8. The optical imaging lens assembly according to claim 1, wherein 3.7<CT1/CT3<4.7,
where CT1 is a center thickness of the first lens along the optical axis and CT3 is a center thickness of the third lens along the optical axis.

9. The optical imaging lens assembly according to claim 1, wherein 0.5<T34/TTL*10<1,
where T34 is a spaced interval between the third lens and the fourth lens along the optical axis and TTL is a distance along the optical axis from a center of the object-side surface of the first lens to an imaging plane of the optical imaging lens assembly.

10. An optical imaging lens assembly, comprising: a first lens, a second lens, a third lens, a fourth lens, a fifth lens, and a sixth lens, which are sequentially arranged from an object side to an image side of the optical imaging lens assembly along an optical axis,
wherein,
the first lens has a positive refractive power, both of an object-side surface and an image-side surface of the first lens are convex surfaces;
the second lens has a negative refractive power;
the third lens has a negative refractive power, and an image-side surface of the third lens is a concave surface;
the fourth lens has a refractive power;
the fifth lens has a refractive power, and an image-side surface of the fifth lens is a convex surface;
the sixth lens has a refractive power, and an object-side surface of the sixth lens is a concave surface;

wherein −2.2<f3/f<−0.6, where f3 is an effective focal length of the third lens and f is the total effective focal length of the optical imaging lens assembly;

f1/CT4>11, where f1 is an effective focal length of the first lens and CT4 is a center thickness of the fourth lens along the optical axis; and

2<T56/CT6<3.5, where T56 is a spaced interval between the fifth lens and the sixth lens along the optical axis and CT6 is a center thickness of the sixth lens along the optical axis.

11. The optical imaging lens assembly according to claim 10, wherein 2<f/f1<2.5, where f is the total effective focal length of the optical imaging lens assembly and f1 is an effective focal length of the first lens.

12. The optical imaging lens assembly according to claim 10, wherein 11<f1/CT4<15, where f1 is the effective focal length of the first lens and CT4 is the center thickness of the fourth lens along the optical axis.

13. The optical imaging lens assembly according to claim 10, wherein −1.3<f/f2<−0.3, where f is the total effective focal length of the optical imaging lens assembly and f2 is an effective focal length of the second lens.

14. The optical imaging lens assembly according to claim 10, wherein 3.7<CT1/CT3<4.7, where CT1 is a center thickness of the first lens along the optical axis and CT3 is a center thickness of the third lens along the optical axis.

15. The optical imaging lens assembly according to claim 10, wherein 0.5<T23/CT2<1.8, where T23 is a spaced interval between the second lens and the third lens along the optical axis and CT2 is a center thickness of the second lens along the optical axis.

16. The optical imaging lens assembly according to claim 10, wherein 0.5<(R10−R11)/(R10+R11)<1.5, where R10 is a radius of curvature of the image-side surface of the fifth lens and R11 is a radius of curvature of the object-side surface of the sixth lens.

\* \* \* \* \*